US011068121B2

(12) United States Patent
Zhao et al.

(10) Patent No.: US 11,068,121 B2
(45) Date of Patent: *Jul. 20, 2021

(54) SYSTEM AND METHOD FOR VISUAL EXPLORATION OF SUBNETWORK PATTERNS IN TWO-MODE NETWORKS

(71) Applicant: FUJIFILM Business Innovation Corp., Tokyo (JP)

(72) Inventors: Jian Zhao, Cupertino, CA (US); Francine Chen, Meno Park, CA (US); Patrick Chiu, Mountain View, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 76 days.

This patent is subject to a terminal disclaimer.

(21) Appl. No.: 15/719,330

(22) Filed: Sep. 28, 2017

(65) Prior Publication Data

US 2019/0095073 A1    Mar. 28, 2019

(51) Int. Cl.
| | | |
|---|---|---|
| *G06F 15/177* | (2006.01) | |
| *G06F 17/00* | (2019.01) | |
| *G06F 3/0481* | (2013.01) | |
| *G06F 16/951* | (2019.01) | |
| *G06F 16/9038* | (2019.01) | |
| *G06Q 50/00* | (2012.01) | |

(Continued)

(52) U.S. Cl.
CPC ...... *G06F 3/04817* (2013.01); *G06F 16/9038* (2019.01); *G06F 16/951* (2019.01); *G06Q 30/0201* (2013.01); *G06Q 50/01* (2013.01); *G06F 3/0482* (2013.01); *H04L 51/16* (2013.01); *H04L 67/22* (2013.01); *H04L 67/36* (2013.01)

(58) Field of Classification Search
CPC ......... H04L 41/22; H04L 45/00; H04L 51/16; G06F 3/04817; G06F 16/9038; G06F 40/166
USPC ................................ 715/737, 200, 734, 763
See application file for complete search history.

(56) References Cited

U.S. PATENT DOCUMENTS

| | | | | |
|---|---|---|---|---|
| 6,112,015 A | * | 8/2000 | Planas ..................... | H04L 41/22 709/220 |
| 6,643,699 B1 | * | 11/2003 | Liver ...................... | H04L 45/14 370/237 |

(Continued)

OTHER PUBLICATIONS

Batagelj et al., Pajex—Program for Analysis and Visualization of Large Networks Reference Manual, published Sep. 2011, University of Ljubljana, pp. 1-98 (pdf).*

(Continued)

*Primary Examiner* — Manglesh M Patel
(74) *Attorney, Agent, or Firm* — Procopio, Cory, Hargreaves & Savitch LLP

(57) ABSTRACT

A method of visualizing relationship data in a network connecting an entity of a first type with an entity of a second type is provided. The method includes detecting, within the network, a subnetwork pattern representing at least one relationship satisfying a condition, generating a visualization based on the detected subnetwork pattern. The visualization includes a first region representative of the first type of entity, a second region representative of the second type of entity, and a linking region connecting the first region to the second region and providing information about the at least one relationship satisfying the condition.

20 Claims, 13 Drawing Sheets

(51) Int. Cl.
 *G06Q 30/02* (2012.01)
 *G06F 3/0482* (2013.01)
 *H04L 29/08* (2006.01)
 *H04L 12/58* (2006.01)

(56) References Cited

U.S. PATENT DOCUMENTS

| | | | | |
|---|---|---|---|---|
| 6,928,436 | B2* | 8/2005 | Baudel | G06T 11/206 |
| 7,454,705 | B2* | 11/2008 | Cadez | H04L 41/0893 |
| | | | | 707/999.007 |
| 8,332,782 | B1* | 12/2012 | Chang | H04L 12/6418 |
| | | | | 707/794 |
| 9,077,634 | B2* | 7/2015 | Zavgren, Jr. | H04L 41/22 |
| 9,092,744 | B2* | 7/2015 | Tito | H04L 43/00 |
| 9,262,514 | B2* | 2/2016 | Eckardt, III | G06F 16/3323 |
| 9,495,775 | B2* | 11/2016 | Chickering | G06T 11/206 |
| 2005/0088978 | A1* | 4/2005 | Zhang | H04L 45/02 |
| | | | | 370/254 |
| 2005/0120030 | A1* | 6/2005 | Varpela | H04L 41/12 |
| 2006/0161867 | A1* | 7/2006 | Drucker | G06F 16/64 |
| | | | | 715/810 |
| 2014/0074850 | A1* | 3/2014 | Noel | G06F 11/0709 |
| | | | | 707/741 |
| 2015/0156076 | A1* | 6/2015 | Matejka | G06F 16/93 |
| | | | | 703/13 |
| 2015/0242079 | A1* | 8/2015 | Vernia | H04L 41/22 |
| | | | | 715/855 |

OTHER PUBLICATIONS

Fiaux, et al. "Bixplorer: Visual Analytics with Biclusters" pp. 90-94. IEEE 2013 (Aug. 2013) (5 pages).

Ghoniem, et al. "On the readability of graphs using node-link and matrix-based representations: a controlled experiment and statistical analysis". Information Visualization (2005) 4, 114-135 (May 19, 2005) (22 pages).

Heinrich, et al. "BiCluster Viewer: A Visualization Tool for Analyzing Gene Expression Data". Advances in Visual Computing, pp. 641-652. Springer, 2011 (12 pages).

Stasko, et al. "Jigsaw: supporting investigative analysis through interactive visualization". Visual Analytics Science and Technology, 2007. VAST 2007. IEEE Symposium.

Sun, et al., "BiSet: Semantic Edge Bundling with Biclusters for Sensemaking", IEEE Transactions on Visualization and Computer Graphics, Aug. 12, 2015, 22(1), pp. 310-319 (Mar. 26, 2008)(15 pages).

Uno, et al. "An Efficient Algorithm for Enumerating Closed Patterns in Transaction Databases". In: Suzuki E., Arikawa S. (eds) Discovery Science. DS 2004. Lecture Notes in Computer Science, vol. 3245. Springer, Berlin, Heidelberg (16 pages).

Notice of Allowance for related U.S. Appl. No. 15/719,321, dated Feb. 18, 2021, in 12 pages.

* cited by examiner

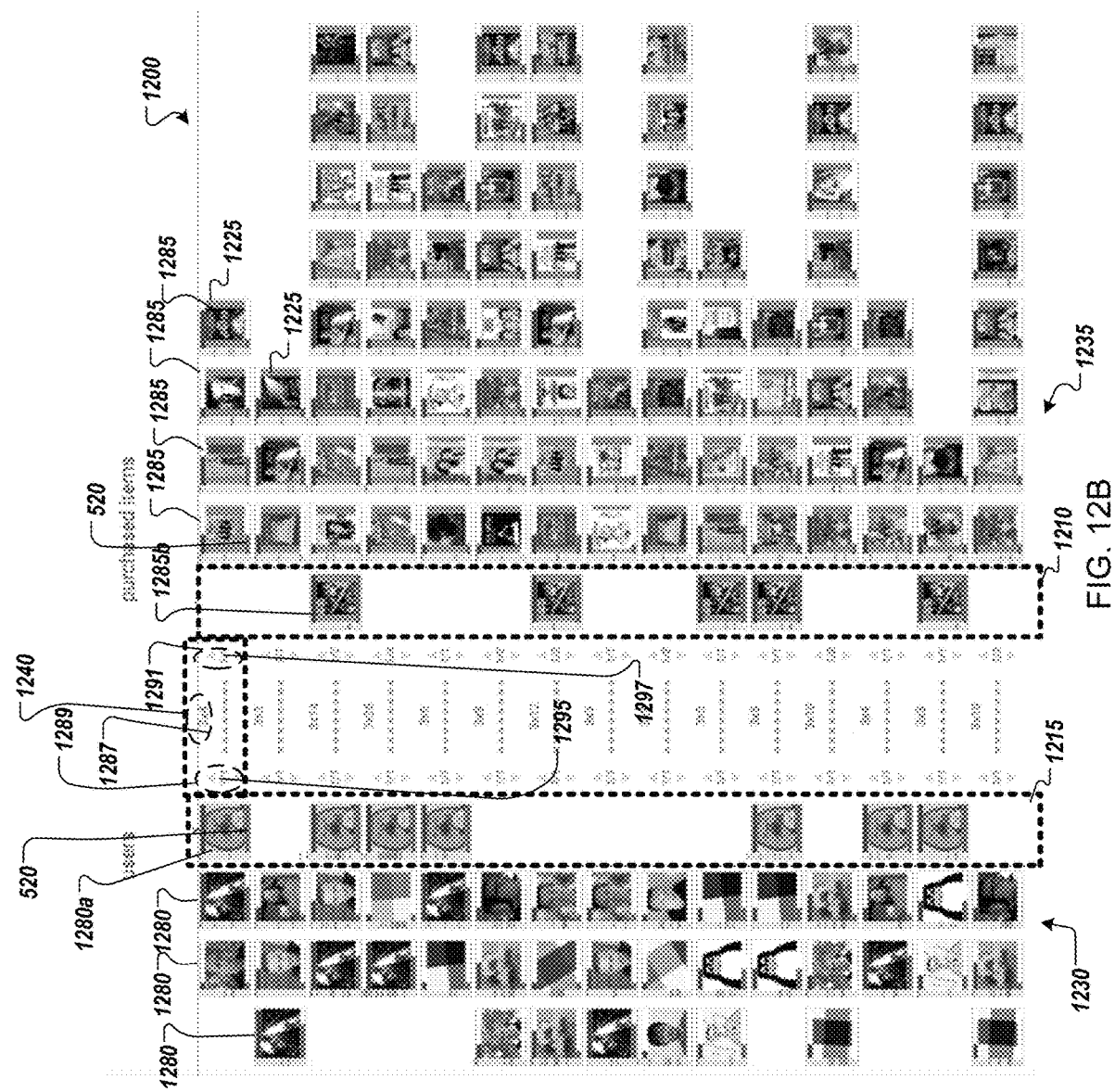

SYSTEM AND METHOD FOR VISUAL EXPLORATION OF SUBNETWORK PATTERNS IN TWO-MODE NETWORKS

BACKGROUND

Field

The present disclosure relates to data visualization systems, and more specifically, to systems and methods of data visualization systems to analyze networks.

Related Art

In many fields, a network may be used as abstract representations of entities (nodes) and relationships (links between nodes). Although many networks may be defined as one-mode or single-mode (e.g., containing one type of entity such as user, author, location, document, etc.), two-mode networks (also known as bipartite graphs) may exist in many real-world applications (e.g., networks of employees and teams in a company, networks of authors and documents in a text corpus, networks of customers and purchases of an online commerce platform). In such related art two-mode networks, links may exist only between different types of nodes, which may be weighted or unweighted. For example, in a related art employee-team network, links may represent memberships of an employee to a team, but there are no direct links between any two different employees or two different teams.

In the related art, analysis of two-mode networks may provide valuable insights to the systems they represent, but is usually more complex than analysis of one-mode networks. In the related art, subnetwork patterns (e.g., a group of nodes and links that present a specific structure or meet a specific condition) may be detected to understand the network properties at both local and global levels. Subnetwork patterns are discussed in greater detail below.

Related art computational methods have been developed to discover patterns in two-mode networks (e.g., biclustering). Although these related art methods may provide some basic insights to the network structures, as the size of networks grows large, the analysis becomes more complicated. For example, many patterns may have overlapping nodes that indicate key players in the network, which may be difficult to spot without an effective representation of the results. Further, related art pattern finding algorithms may have deficiencies requiring manual inspection. For example, using related art algorithms may not detect high-level patterns indicated by multiple nodes being shared by several patterns that may be revealed when the multiple nodes are viewed together.

However, related art visualization systems are designed for exploring general networks that are usually one-mode. Related art visualization techniques designed for single mode networks may not allow easy identification of subnetwork patterns. Further, some related art visualization techniques that may illustrate subnetwork patterns (such as biclustering) are not as scalable, and are not general enough to accommodate weighted two-mode networks. Although several could be extended to display two-mode networks, they are not adequate for subnetwork pattern analysis tasks. This invention tackles the specific problem of studying patterns in two-mode networks based on interactive visualization techniques. Many related art visualization systems only offer a data overview, missing more effective visualization of all patterns.

SUMMARY OF THE DISCLOSURE

Aspects of the present disclosure may include a method of visualizing relationship data in a network connecting an entity of a first type with an entity of a second type is provided. The method includes detecting, within the network, a subnetwork pattern representing at least one relationship satisfying a condition, generating a visualization based on the detected subnetwork pattern. The visualization includes a first region representative of the first type of entity, a second region representative of the second type of entity, and a linking region connecting the first region to the second region and providing information about the at least one relationship satisfying the condition.

Additional aspects of the present disclosure may include a non-transitory computer readable medium having stored therein a program for making a computer execute a method of visualizing relationship data in a network connecting an entity of a first type with an entity of a second type. The method includes detecting, within the network, a subnetwork pattern representing at least one relationship satisfying a condition, generating a visualization based on the detected subnetwork pattern. The visualization includes a first region representative of the first type of entity, a second region representative of the second type of entity, and a linking region connecting the first region to the second region and providing information about the at least one relationship satisfying the condition.

Aspects of the present disclosure may also include a computer apparatus configured to visualize relationship data in a network connecting an entity of a first type with an entity of a second type. The computer apparatus may include a memory storing the relationship data comprising a plurality of entities of the first type, a plurality of entities of the second type, and data representative of a plurality of relationships, each relationship connecting an entity of the plurality of entities of the first type to an entity of the plurality of entities of the second type, a processor, and a display device configured to display a generated visualization. The processor may execute a process including detecting, within the network, a plurality of subnetwork patterns, each of the plurality of subnetwork patterns representing at least one relationship satisfying a condition, and generating the visualization based on the detected plurality of subnetwork patterns. The generated visualization includes a plurality of rows, each row associated with one of the detected subnetwork patterns satisfying the condition, and includes a first region representative of the first type of entity, a second region representative of the second type of entity, and a linking region connecting the first region to the second region and providing information about the at least one relationship satisfying the condition.

Additional aspects of the present disclosure may also include a computer apparatus configured to visualize relationship data in a network connecting an entity of a first type with an entity of a second type. The computer apparatus may include means for storing the relationship data comprising a plurality of entities of the first type, a plurality of entities of the second type, and data representative of a plurality of relationships, each relationship connecting an entity of the plurality of entities of the first type to an entity of the plurality of entities of the second type, means for detecting, within the network, a plurality of subnetwork patterns, each of the plurality of subnetwork patterns representing at least one relationship satisfying a condition, means for generating a visualization based on the detected plurality of subnetwork patterns, and means for displaying the generated visualization. The visualization includes a plurality of rows, each row associated with one of the detected subnetwork patterns satisfying the condition, and including a first region representative of the first type of entity, a second region representative of the second type of entity, and a linking region connecting the first region to the second region and providing information about the at least one relationship satisfying the condition.

BRIEF DESCRIPTION OF THE DRAWINGS

FIGS. 12A and 12B illustrates example implementations of a UI usable as a visualization in accordance with another example implementation of the present application.

DETAILED DESCRIPTION

Figure 1:
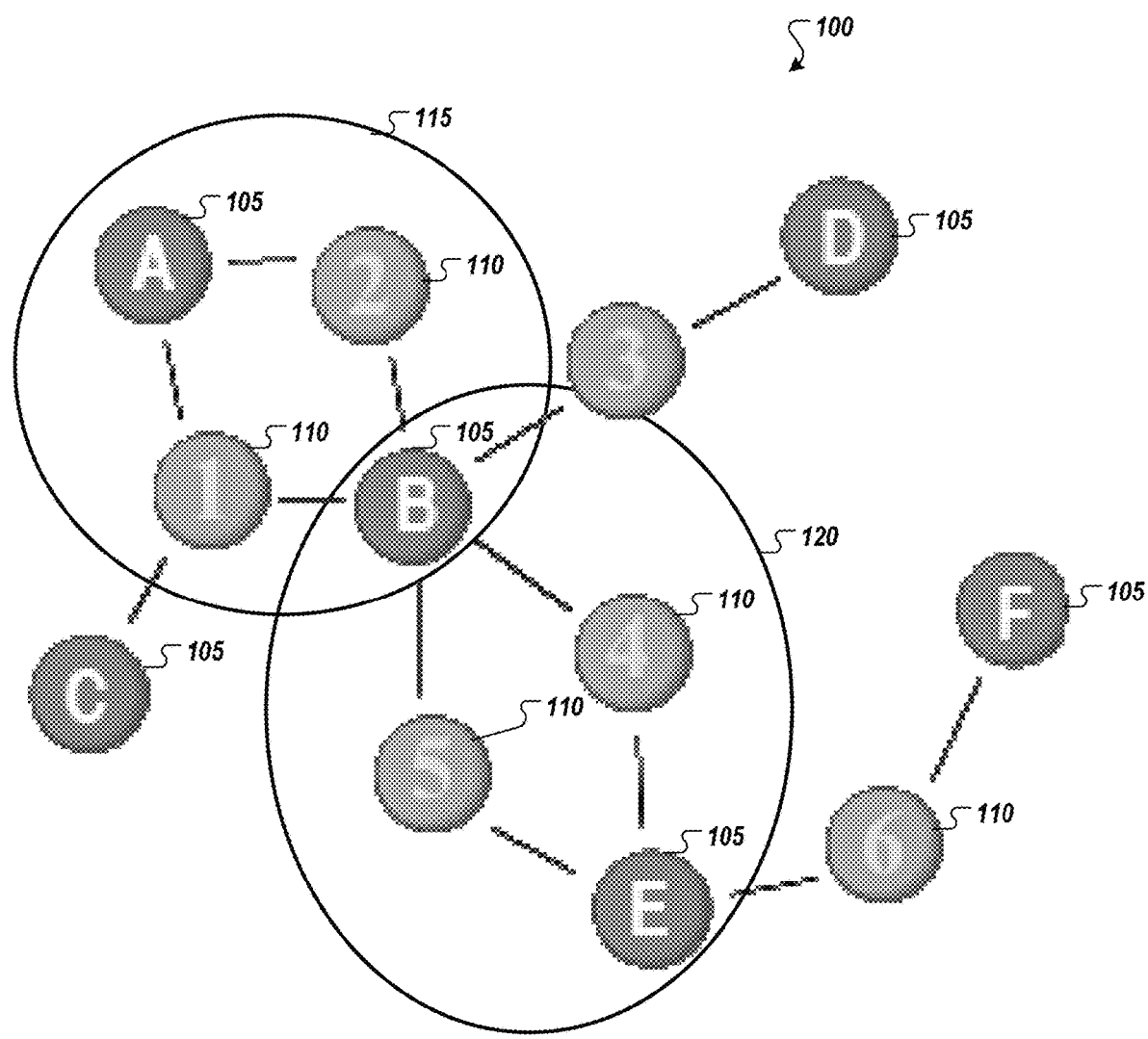
FIG. 1 illustrates an example two-mode network.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

A two-mode network is a special kind of network which consists of two types of entities (nodes) and relations (links) between different types of entities. Two-mode networks may summarize the association between one entity and another, and they exist in many application scenarios, for example, connections between employees and teams in an organization. Specific subnetwork patterns may be of interest by analysts. One type of subnetwork pattern may be a clique.

A clique is a maximal, complete subgraph in a two-mode network. Complete means that every node of one type has connections to all the nodes of another type in this subgraph; and maximal means that adding extra nodes and links to this subgraph breaks the maximal definition.

FIG. 1 illustrates an example two-mode network 100 formed by a first type of entities 105 (A-F) and a second type of entities 110 (1-6). In FIG. 1, subnetwork pattern 115 formed of first type entities 105 (A, B) and second type entities 110 (1, 2) illustrates a clique because it is both complete and maximal. Subnetwork pattern 115 is complete because all of the first type of entities 105 (A, B) are connected to all of the second type entities 110 (1, 2). Subnetwork pattern 115 is maximal because no other first type entities 105 (C-F) within the network 100 is connected to all of the second type entities 110 (1, 2) of the subnetwork pattern 115, and no other second type entities 110 (3-6) within the network 100 is connected to all of the first type entities 110 (A, B) of the subnetwork pattern 115.

In FIG. 1, subnetwork pattern 120 formed of first type entities 105 (B, E) and second type entities 110 (4, 5) also illustrates a clique because it is also both complete and maximal. Subnetwork pattern 120 is complete because all of the first type of entities 105 (B, E) are connected to all of the second type entities 110 (4, 5). Subnetwork pattern 120 is maximal because no other first type entities 105 (A, C, D, F) within the network 100 is connected to all of the second type entities 110 (4, 5) of the subnetwork pattern 120, and no other second type entities 110 (1-3, 6) within the network 100 is connected to all of the first type entities 110 (B, E) of the subnetwork pattern 120.

Cliques, such as those illustrated in FIG. 1, may have real semantic meanings in different applications, which might be important in social network analysis. For example, a clique in an employee-team network may indicate all teams have certain employees in common, which may have implications for resource allocation; similarly, in an author-publication network, a clique may represent these authors are all on a certain group of publications, indicating a close collaboration.

Example implementation may identify subnetwork patterns from a two-mode network and visualizes the results, allowing for interactive exploration of patterns in data. These example implementations may enable users to discover complex relationships among all the detected patterns in a network, such as node overlaps, and may also allow examination of meta-data information associated with nodes and links in these patterns. Example implementations may also include a visualization system that may emphasize the two different types of nodes within a two-mode network by separating the two different types.

Figure 2:
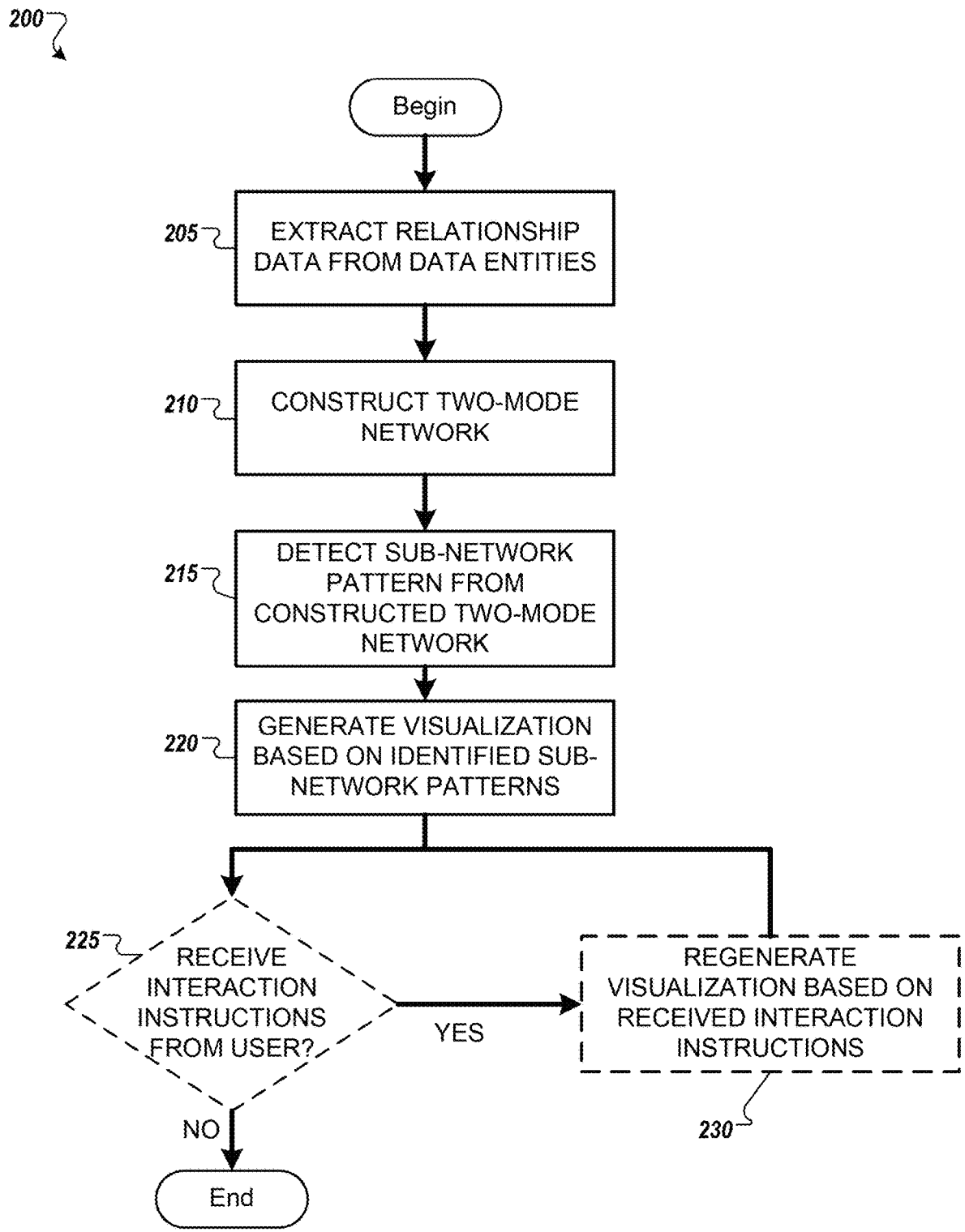
FIG. 2 illustrates a flowchart of a visualization process according to an example implementation of the present application.

FIG. 2 illustrates a flowchart of a visualization process 200 according to an example implementation of the present application. The illustrated process 200 may be performed by a processor (such as processors 1310) of a device or apparatus (such as computing device 1305 of FIG. 13) to provide subnetwork pattern detection and visualization. As illustrated in process 200, relationship information is extracted from a plurality of data entities at 205. The data entities may be of two or more different types. The different types of data entities are not particularly limited and may include user entity, creator or author entity, reader entity, content item or document entity, purchase entity, communication entity or any other entity that might be apparent to a person of ordinary skill in the art. The entities may be received or selected from a database. The type of database is not particularly limited and may include any type of data records including email data, travel data, phone call data, instant message data, event data, content data, purchase data or any other type of data that might be apparent to a person of ordinary skill in the art.

The relationship information between the entities may be extracted by extracting content features from each of the plurality of entities. The extraction of the content features is not particularly limited and may include applying object recognition techniques (e.g., object recognition, facial recognition, character recognition, etc.) to images or videos associated with the content item to identify the visual content. Additionally, audio recognition techniques (e.g., audio event detection, audio characteristic classification, speech recognition, etc.) may be used to detect the audio content associated with the content item. Additionally, subject matter recognition algorithms may be used to detect subjects or topics of textual content of the content item. The extracted content features may also include other types of features about the content item such as location of capture or authorship (e.g., Global Positioning System (GPS) data, etc.) or any other content features that might be apparent to a person of ordinary skill in the art.

The relationships data may be extracted from the entities by matching content features associated with entities of one type with corresponding content features of entities of another, different type. For example, if content features associated with a content item or document entities indicates authorship by a certain person or persons, and content features associated with a creator or author entities indicates identity information by the same person or persons, a relationship may be stored in the relationship data. Other examples of relationships between entities of different types may be apparent to a person of ordinary skill in the art, including user entity-communication entity, user entity-purchase entity, reader entity-communication entity, reader entity-content or document entity, etc.

Once relationship data is extracted from the plurality of entities, a two-mode network may be constructed at 210 by connecting entities of one type to entities of a second type. In some example implementations, entities of one type (e.g., a first type) may only be connected directly with entities of the second, different type and not to other entities of the first type. Similarly, entities of the second type may only be connected directly with entities of the first type and not to other entities of the second type.

In some example implementations, relationships between individual entities of one type may be connected to individual entities of the second type based on predefined data associated with each entity. For example, a creator or author entity relationship with a created content or document entity. In other example implementations, multiple entities of one type may be joined together to form the relationship. For example, posts in a chat application within a certain time frame may be grouped as a conversation and users who published posts within the conversation may be connected to the entire conversation.

After constructing a two-mode network, which may represent a real-world system, subnetwork patterns can be detected using a variety of techniques at 215. For example, brute force methods can be used to find subnetwork patterns such as cliques or faster (e.g., linear) approaches such as biclustering. Example implementations are not limited to any particular subnetwork pattern finding process and may use any technique to identify subnetwork patterns of interest that might be apparent to a person of ordinary skill in the art.

After the subnetwork patterns are identified, a visualization may be generated at 220. The generated visualization may be displayed on a computing device or apparatus such as a personal computer, a server, a mainframe, or any other computing device that might be apparent to a person of ordinary skill in the art. Example implementations of the visualization are discussed in greater detail below with respect to FIGS. 3-7, and 10-12. In some example implementations, the process 200 may end once the visualization is generated.

In other example implementations, a determination whether interaction instructions have been received from a user may optionally be made at 225. The user instructions may be received from a user input device such as a keyboard, pointing device (e.g., a mouse, trackball, touchpad), interactive display (e.g., a touch screen display), or any other user input device that might be apparent to a person of ordinary skill in the art. In some example implementations, the user instructions may be received through a user interface (UI), such as a toolbar or other control elements, integrated into the visualization generated at 220. In other example implementations, the user instructions may be received through a separate UI independent of the visualization generated at 220.

If user interaction instructions are received (YES at 225), the visualization may optionally be regenerated based on the received interaction instructions at 230. Regeneration of the visualization may include reordering portions of the visualization, repositioning portions of the visualization, removing portions from the visualization, adding portions to the visualization, or any other changes to the visualization that might be apparent to a person of ordinary skill in the art. Example implementations of a process of regenerating the visualization are discussed in greater detail below with respect to FIGS. 2, 8, and 9.

Conversely, if no user interactions are received (NO at 225), the process 200 may end.

Figure 3:
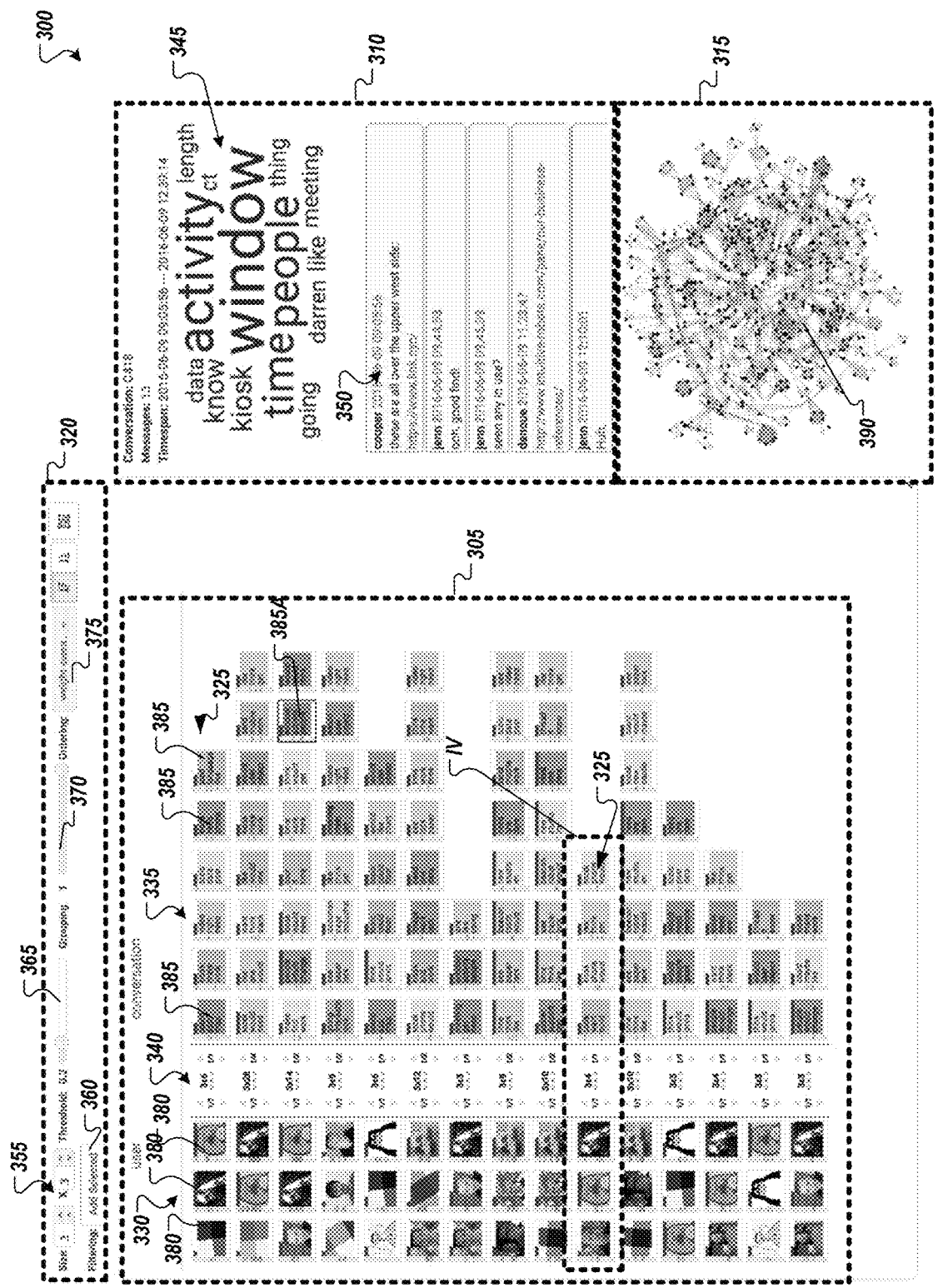
FIG. 3 illustrates a user interface (UI) usable as a visualization in accordance with example implementations of the present application.

FIG. 3 illustrates a user interface (UI) 300 usable as a visualization in accordance with example implementations of the present application. The UI 300 may be produced using the process 200 discussed above and may be displayed on a computing device or apparatus such as a personal computer, a server, a mainframe, or any other computing device that might be apparent to a person of ordinary skill in the art. The UI 300 may represent a visualization of a network connecting users of a communications system (e.g., an instant messaging platform, emailing platform, electronic posting board, a short message service (SMS) platform or other communication platform) and communications or posts within the communication system. Other types of visualizations are discussed in greater detail below with respect to FIGS. 10-12.

In some example implementations, the UI 300 may include four parts. For reference purposes, each of the four parts has been highlighted with a broken line box in FIG. 3. As illustrated, the UI 300 may include a main view 305, which may be used to show the results of subnetwork pattern detection (215 of process 200 of FIG. 2). The UI 300 may also include an information panel 310 for displaying content features associated with entities displayed in the main view 305 (e.g., the information panel 310 may illustrate meta-data associated with entities). Further, the UI 300 may include an overview region 315 for showing the topology of an entire network and a toolbar 320 that may be used for manipulating the UI 300 (e.g., sending interaction instructions that may be received at 225 of process 200 of FIG. 2).

The main view 305 may include a plurality of rows 325, each row 325 representing one of the detected subnetwork patterns. For ease of illustration only two rows 325 have been labeled in FIG. 3. However, each of the rows illustrated in the main view 305 of the UI 300 of FIG. 3 may be representative of one of the detected subnetwork patterns even if a reference numeral is not provided. Within each row 325 of the main view 305, three regions 330, 335,340 may be provided. The left region 330 may be associated with a first type of entity represented by node icons 380. The right region 335 may be associated with a second type of entity represented by node icons 385. Depending on the type of entity represented by each node icon 380, 385, the node icon 380, 385 may be shown as an image, or a text summary. For example, a message or communication analysis implementation is illustrated in FIG. 3. As illustrated, entities of the first type in the left region 330 are users and node icons 380 are rendered as images of their profiles. Further, the entities of the second type in the right region 335 are conversations (e.g., collections of communications responsive to each other) in which the users have participated and node icons 385 may be are rendered with the key terms of the contents of the underlying conversations. The node icons 380, 385 are discussed in greater detail below with respect to general node icon 500 of FIG. 5.

The left region 330 is connected to right region 335 by a central or linking region 340, which may provide information about the subnetwork pattern associated with each row 325. For example a number of entities of the first type in the right region 335 and a number of entities of the second type in left region 385 may be displayed in the linking region 340. Additionally, in some implementations more entities of the first type 380 or the second type 385 may be associated with a subnetwork pattern than can be displayed in the left and right regions 330, 335 of a row 325. In such implementations, the linking region 340 may provide controls to scroll or toggle the left and right regions 330, 335 of the row 325 to display additional entities of the first type 380 or the second type 385. The display of each row is discussed in greater detail below with respect to FIG. 4, which illustrates an enlarged view of region IV of FIG. 3.

Additionally, in FIG. 3 the information panel 310 includes content information region 345 providing information about the content associated with subnetwork patterns associated with the rows 325 illustrated in the main view 305. The information panel 310 may be related to a selected entity (e.g., the second type of entity associated with node icon 385a). The content information region 345 may be illustrated by a cluster of words representative of content detected as being associated with the conversation associated with node icon 385a (e.g., an entity of the second type). In some implementations, the size of the words in the content information region 345 may be representative of the frequency of occurrence of the content within the conversations (e.g., the entity of the second type).

The information panel 310 may also include a sample display section 350 that displays communications associated with the selected conversation associated with node icon 385a (e.g., an entity of the second type). As illustrated, the selected conversation associated with node icon 385a (e.g., an entity of the second type) may include five messages between three users.

Further, in FIG. 3 the overview region 315 provides global node map 390 illustrating the topology of an entire network. In some example implementations, the global node map 390 may allow navigation of the entire network. For example, the global node map 390 may be manipulated (e.g., rotated, resized, or moved) and the manipulation of the global node map 390 may cause changes in the main view 305. For example, rotating the global node map 390 may change the relationships shown in the main view 305 or may change the number of rows shown. Other manipulations may be apparent to a person of ordinary skill in the art.

The main view 305 of the UI 300 may also provide some basic interactivities for exploring the data using the information panel 310 and the overview region 315. For example, hovering over a link or an entity 380, 385 in the main view 305 may reveal corresponding meta-data in the information panel 310, as well as nodes and links in the overview region 315. For example, as illustrated, the conversation (entity 385a) is hovered over and the information panel 310 shows tag clouds of the conversation key terms in the content information region 345 and the raw conversations in the sample display section 350.

The UI 300 may also enable a range of other interactions through the toolbar 320, for example, filtering the patterns based on size, filtering nodes (based on selection) and links (based on weight), and grouping and reordering patterns.

The toolbar 320 may provide several interface controls for a user to perform data detected subnetwork patterns represented by the rows 325 in the main view 305. For example, numeric fields 355 may be used to specify a minimum number of entities of the first and second type for the detected subnetwork patterns (e.g., at least 3 entities of the first type and at least 3 entities of the second type). Further, a text window 360 may be used to specify keywords or terms to be used to filter entities or relationships to be analyzed for subnetwork pattern detection and display in the main view 305. For example, a user may enter keywords of interests and the keywords of interest may be used to identify conversations or users for display in the main view 305.

Control bar 365 may be used to specify minimum probabilities of association between the keywords and the detected entities to be used in the subnetwork pattern detection. For example, only conversations including communications with topical probabilities above a threshold set by the control bar 365 may be displayed. Control bar 370 may be used to specify a minimum grouping parameter to be used to generate the main view 305 and control features 375 may be used to specify how the subnetwork patterns associated with the rows 325 of the main view 305 should be displayed. For example, the rows 325 may be order based on a weighted average of content or topical probabilities or any other parameter that might be apparent to a person of ordinary skill in the art. Based on user interaction with the toolbar 320, the UI 300 may be updated or modified using a process such as process 800 illustrated in FIG. 9.

Figure 4:
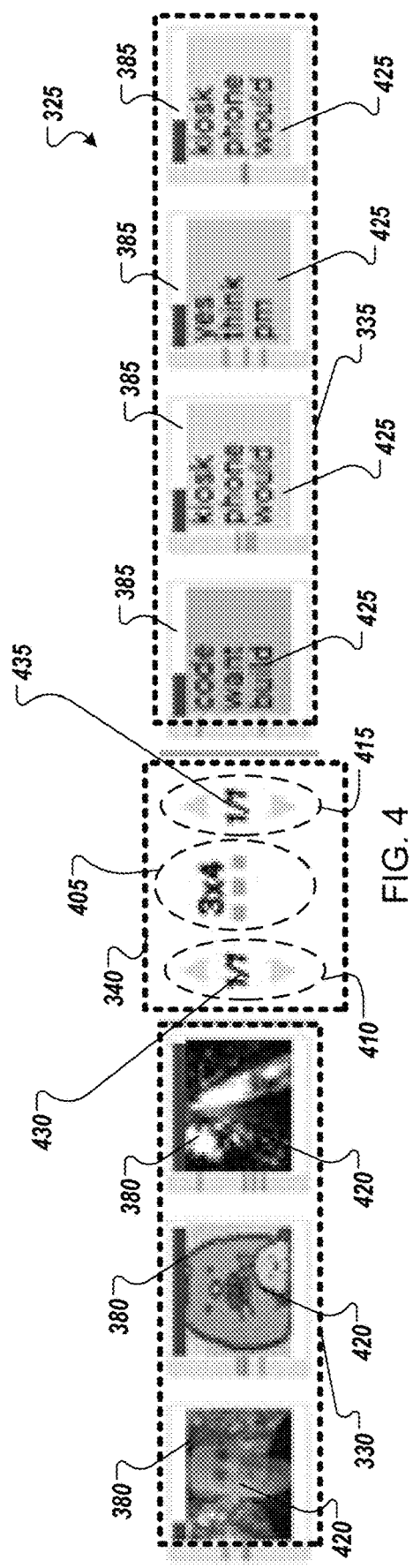
FIG. 4 illustrates an enlarged portion of the UI of FIG. 3.

FIG. 4 illustrates an enlarged portion IV of the main view 305 of the UI 300 of FIG. 3. As illustrated, a row 325 of the main view 305 of the UI 300 illustrated in FIG. 3 above has been enlarged to illustrate features thereof. The row 325 may be representative of a subnetwork pattern detected in a network of connected entities. For example, in FIGS. 3 and 4, a message or communication analysis implementation is illustrated. The row 325 illustrated in FIG. 4 may be representative of the other rows 325 illustrated in the main view 305 of the UI 300 of FIG. 3 and other rows 325 illustrated in FIG. 3 may have similar features, even if not specifically identified in FIG. 3.

As discussed above, the row 325 includes a plurality of node icons 380, 385 and the row 325 may be divided into three regions 330, 335, 340 (highlighted with broken line boxes in FIG. 4). The left region 330 may be associated with a first type of entity represented by node icons 380. In the example implementation of FIGS. 3 and 4, the entities of the first type in the left region 330 may be users of a message or communication system and node icons 380 may include rendered images 420 from the user's profiles (e.g., a user avatar or profile image). Additionally, the right region 335 may be associated with a second type of entity represented by node icons 385. In the example implementation of FIGS. 3 and 4, the entities of the second type in the right region 335 may be conversations (e.g., collections of communications responsive to each other) in which the users (entities of the first type) have participated. The node icons 385 associated with the entities of the second type may be rendered with a listing 425 of the key terms extracted from the contents of the underlying conversations. Additional features of example implementations of the node icons 380, 385 are discussed in greater detail below with respect to FIG. 5.

As illustrated, the left region 330 of the row 325 may be connected to right region 335 by the central or linking region 340. The central or linking region 340 may provide information about the subnetwork pattern associated with each row 325. For example, a subnetwork pattern size indicator 405 may be provided to identify size of the subnetwork pattern identified. The subnetwork pattern size indicator 405 (highlighted with a broken oval) may indicate the number of entities of the first type in the right region 335 and a number of entities of the second type in left region 335. In the example implementation illustrated in FIG. 4, the subnetwork pattern size indicator 405 value of "3×4" may indicate that subnetwork pattern associated with the illustrated row 325 includes 3 entities of the first type in the left region 330 and 4 entities of the second type in the right region 335.

Additionally, in some implementations more entities of the first type 380 or the second type 385 may be associated with a subnetwork pattern than can be displayed in the left and right regions 330, 335 of the row 325. In such implementations, the linking region 340 may provide user interface (UI) controls 410, 415 (highlighted with broken ovals) associated with the left region 330 and right regions 335 respectively. Each UI control 410, 415 may allow scrolling or toggling of the left and right regions 330, 335 respectively, to display additional entities of the first type 380 or the second type 385 that cannot be displayed. Each UI control 410, 415 may also have page indicators 430, 435. The page indicator 430 may indicate the current page of entities 380 being displayed in the left region 330. Additionally, in some example implementations, the page indicator 430 may also indicate the total number of pages of entities 380 available. In the example implementation illustrated in FIG. 4, the page indicator 430 value of "1/1" may indicate that currently page number "1" of a total of one available page is displayed in the left region 330.

Similarly, the page indicator 435 may indicate the current page of entities 385 being displayed in the right region 335. Additionally, in some example implementations, the page indicator 435 may also indicate the total number of pages of entities 385 available. In the example implementation illustrated in FIG. 4, the page indicator 435 value of "1/1" may indicate that currently page number "1" of a total of one available page is displayed in the right region 335.

Figure 5:
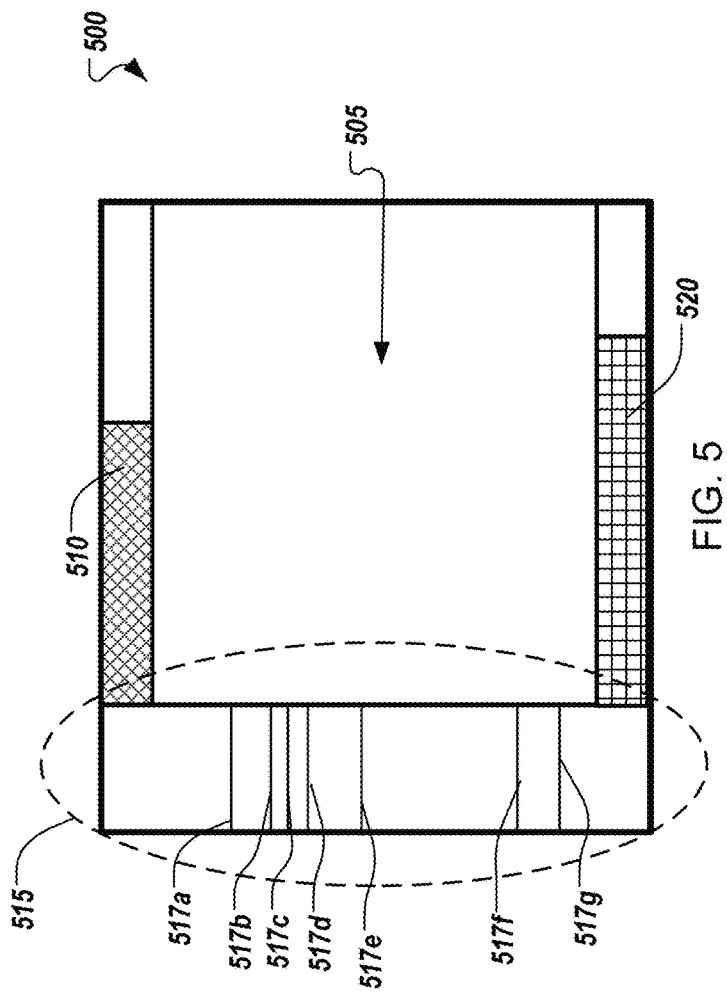
FIG. 5 illustrates a general construction of a node icon usable in example implementations of the present application.

FIG. 5 illustrates a general construction of a node icon 500 usable in example implementations of the present application. In some example implementations, the illustrated node icon 500 may be used as a node icon 380, 385 in a main view 305 of the UI 300 to represent entities of first or second types in a network of entities. The node icon 500 includes a main area 505 that may include information descriptive or indicative of the entity with which the node icon 500 is associated. For example, as discussed above, the node icon 380 may include rendered images 420 (in FIG. 4) from the user's profiles (e.g., a user avatar or profile image). The rendered images 420 may be displayed in the main area 505. As another example described above, the node icon 385 may include a listing 425 (in FIG. 4) of the key terms extracted from the contents of the underlying conversations. Again, the listing 425 of key terms may be displayed in the main area 505. Other information that might be descriptive or indicative of the entity with which the node icon 500 is associated may be displayed in the main area 505 may be apparent to persons of ordinary skill in the art.

The node icon 500 may include a horizontal bar 510 that indicates the numbers of subnetwork patterns the entity associated with the node icon is a part of across all subnetwork patterns identified. Thus, the longer the horizontal bar 510 is, the more patterns the entity associated with the node icon belong. In some example implementations, the horizontal bar 510 might help an analyst identify key entities in the network as they appear in many different patterns.

The node icon 500 may also include a region 515 having one or more vertically arranged horizontal lines 517a-517g. Each of the horizontal lines 517a-517g may be representative of links (e.g., relationships) connecting the entity associated with the node icon 500 to other entities in the network. In some example implementations, the links (e.g., relationships) may have weights or weighting factors, which may correspond to the vertical (e.g., y-position) of the horizontal lines 517a-517g. In some example implementations, this configuration may allow an analyst to be able to see the distribution of link (e.g., relationship) weights associated with each entity.

Additionally, as discussed below with respect to FIG. 7, an example implementation of the UI 300 may allow an analyst to select or "pin" an entity to form a separate column. In such implementations, the node icon 500 may also include a second horizontal bar 520, representing the proportion of patterns to which the entity associated with the node icon belongs, among all the "selected" patterns (e.g., patterns containing the "pinned" entity). The length of the second horizontal bar 520 may indicate how many selected patterns contain a specific entity associated with the node icon 500. In some example implementations, this configuration may help an analyst identify a next most relevant entity with respect to the pinned entities.

In some example implementations, "pinning" or selecting an entity may also cause subnetwork patterns not associated (e.g., negatively associated) with the entity to be repositioned or highlighted. For example, selection of an entity 385 may cause rows 325 not containing the entity to be moved or highlighted to allow pinning to be used to exclude, rather than include entities. Other aspects of "pinning" operations using example implementations of the UI 300 are discussed in greater detail below with respect to FIG. 7.

Figure 6:
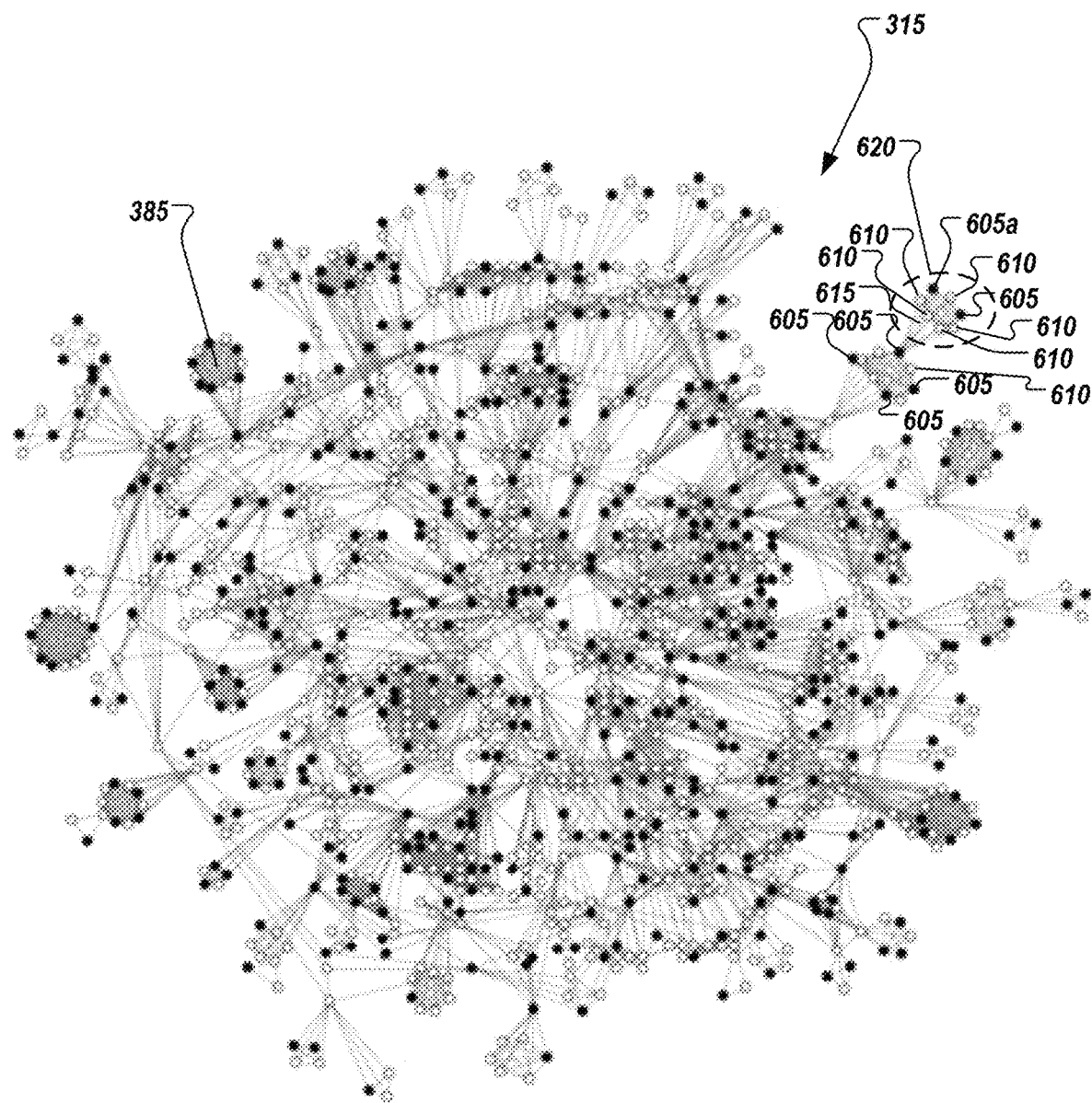
FIG. 6 illustrates an enlarged view of another portion of the UI of FIG. 3.

FIG. 6 illustrates an enlarged view of the overview region 315 of the UI 300 of FIG. 3. As illustrated, the overview region 315 provides a global node map 390. The global node map is formed by a plurality of nodes 605 of a first type (represented with black dots), a plurality of nodes 610 of a second type (represented by white dots), and links 615 connecting the nodes 605 of the first type to the nodes 610 of the second type. Each of the nodes 605 of the first type may correspond to an entity of the first type represented by node icons 380 in FIGS. 3 and 4 above. Further, each of the nodes 610 of the second type may correspond to an entity of the second type represented by node icons 385 in FIGS. 3 and 4 above. Additionally, each of the links 615 may represent a relationship between the entities of the first type and the entities of the second type.

In FIG. 6, some of nodes 605 of the first type (e.g., black dots) have been labeled. However, the unlabeled nodes (e.g., black dots) may be substantially similar to the labeled nodes 605 and may have the same features thereof. Additionally, some of nodes 610 of the first type (e.g., white dots) have been labeled. However, the unlabeled nodes (e.g., white dots) may be substantially similar to the labeled nodes 610 and may have the same features thereof. Further, though only some of the links 615 may be labeled in FIG. 6, unlabeled links may be substantially similar to, and may have the same features of, labeled links 615.

By manipulating the nodes 605, 610 and the links 615 of the global node map 390, the main view 305 of FIG. 3 may be changed. For example, by selecting one of nodes 605a, the subnetwork pattern 620 including that node 605a may be highlighted or displayed. Other manipulations and effects may be apparent to a person of ordinary skill in the art.

Figure 7:
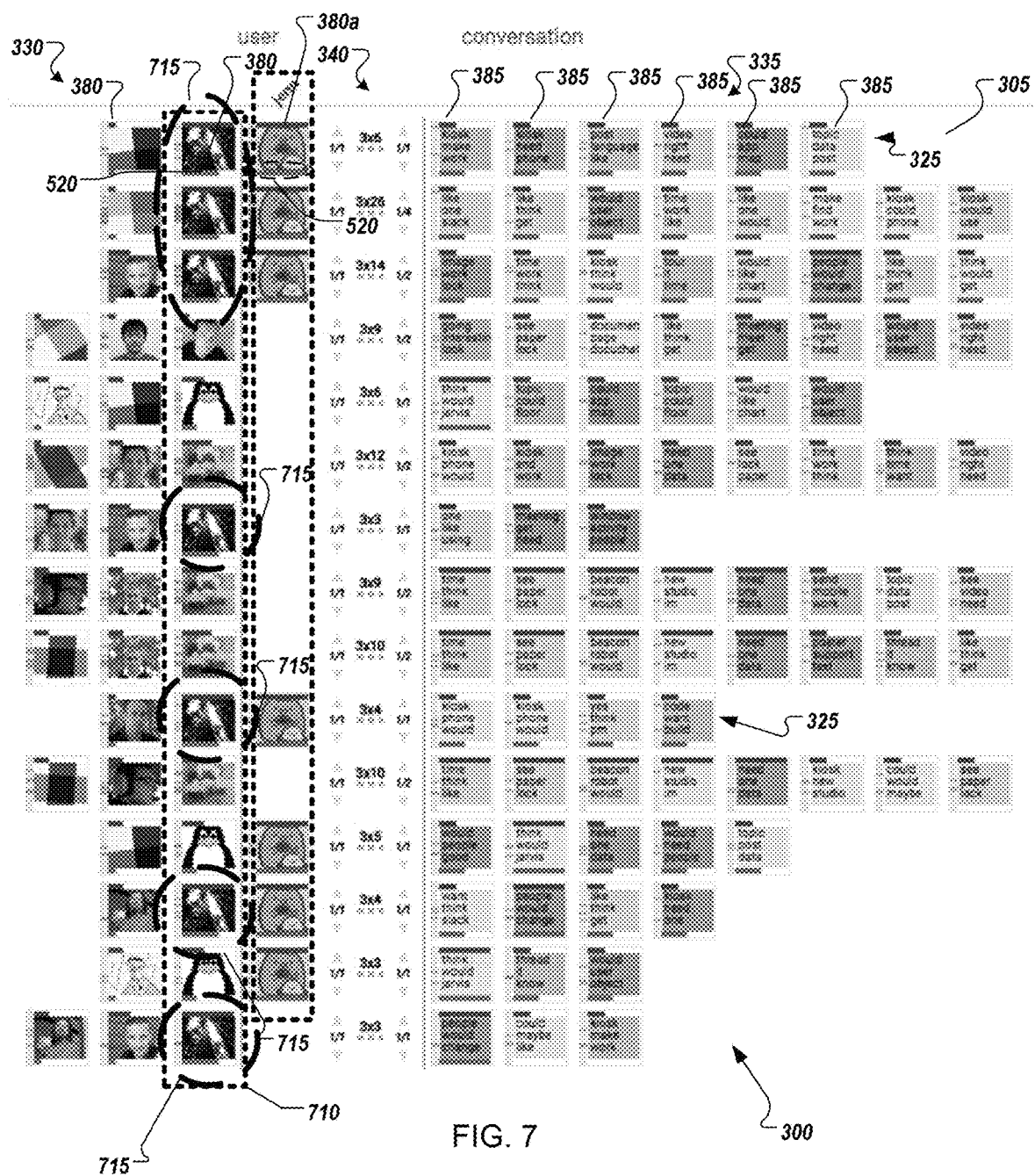
FIG. 7 illustrates the UI of FIG. 3 reorganized based on user selection.

FIG. 7 illustrates the main view 305 of the UI 300 of FIG. 3 reorganized based on user selection of an entity. The UI 300 may be produced using the process 200 discussed above and may be displayed on a computing device or apparatus such as a personal computer, a server, a mainframe, or any other computing device that might be apparent to a person of ordinary skill in the art. The UI 300 may represent a visualization of a network connecting users of a communications system (e.g., an instant messaging platform, emailing platform, electronic posting board, a short message service (SMS) platform or other communication platform) and communications or posts within the communication system. Other types of visualizations are discussed in greater detail below with respect to FIGS. 10-12.

Again, the main view 305 may include a plurality of rows 325, each row 325 representing one of the detected subnetwork patterns. For ease of illustration only two rows 325 have been labeled in FIG. 7. However, each of the rows illustrated in the main view 305 of the UI 300 of FIG. 7 may be representative of one of the detected subnetwork patterns even if a reference numeral is not provided. Within each row 325 of the main view 305, three regions 330, 335, 340 may be provided. The left region 330 may be associated with the first type of entity represented by node icons 380. The right region 335 may be associated with a second type of entity represented by node icons 385.

In FIG. 7, a message or communication analysis implementation is illustrated. As illustrated, entities of the first type in the left region 330 are users and the entities of the second type in the right region 335 are conversations (e.g., collections of communications responsive to each other) in which the users have participated.

Based on user input, one of entities of the first type (380a, "JENN") has been selected or "pinned" for deeper exploration. After the entity 380a has been pinned, the main view has been rearranged to form a separate column for entity 380a. This may allow clearer visualization to see which subnetwork patterns this entity 380a belongs to. When the entity 380a is pinned, the other unpinned entities 380 may be are reordered based on their relevancy to the pinned entity 380a in each row. This may bring more relevant entities to the center (represented by broken rectangle 710) region so that an analyst can more easily access them. After pinning entity 380a, the second horizontal bar 520 of the entities 380, 380a may be dynamically shown under each node icon, representing the proportion of patterns to which that entity 380, 380a belongs, among all the "selected" patterns. Again, selected patterns mean the patterns containing the pinned entity 380a. So the length of the second horizontal bar 520 indicates how many selected patterns contain a specific entity 380. This may help an analyst to identify a next most relevant entity 380 with respect to the pinned entity 380a. For example, in FIG. 7, pinning in the UI 300 may allow recognition that the user who chats most frequently with the pinned entity 380a (appearing in the same patterns) is the entity 380 with the profile image of trees (highlighted with broken circles 715) as it has the longest second horizontal bars 520 among the unpinned entities 380.

In some example implementations, "pinning" or selecting an entity may also cause subnetwork patterns not associated (e.g., negatively associated) with the entity to be repositioned or highlighted. For example, selection of an entity 385 may cause rows 325 not containing the entity to be moved or highlighted to allow pinning to be used to exclude, rather than include entities.

Figure 8:
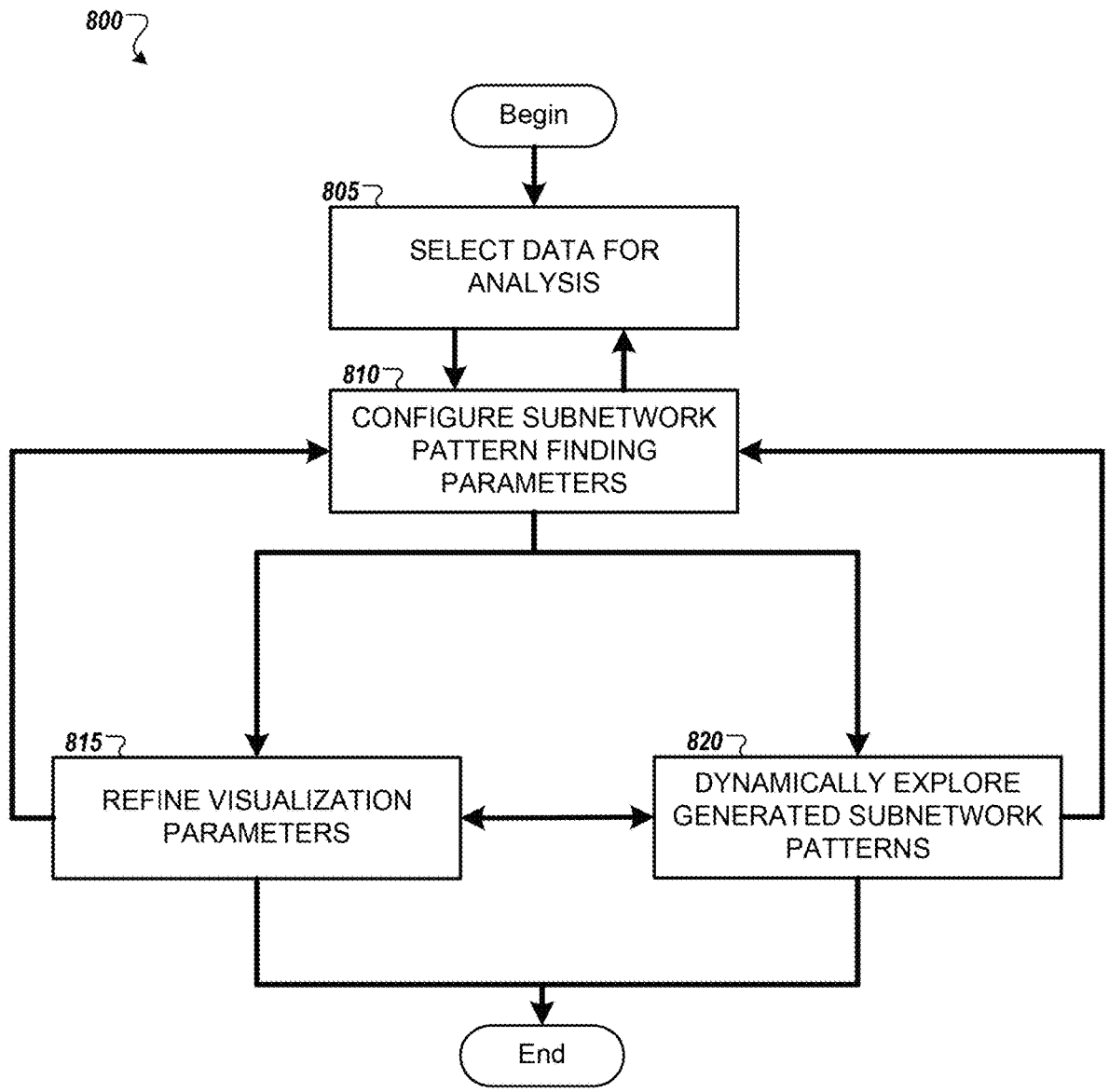
FIG. 8 illustrates a flowchart for a process of interacting and updating a UI in accordance with example implementations of the present application.

FIG. 8 illustrates a flowchart 800 for a process of interacting and updating the UI 300 in accordance with example implementation of the present application. The illustrated process 800 may be performed by a processor (such as processors 1310) of a device or apparatus (such as computing device 1305 of FIG. 13) to provide subnetwork pattern detection and visualization. In the process 800, a user first defines the scope of the exploration by selecting a range of data at 805. In some example implementations, the range of data for analysis may be selected using a User Interface or uploading a collection of data to a system. For example, the overview region 315 may be used to define data for analysis. Other UI or other data manipulation mechanism may be used as may be apparent to a person of ordinary skill in the art. Alternatively, as discussed in greater detail below, the data selected for analysis may be search results received from a search engine.

After the range of data for analysis has been defined, subnetwork pattern finding parameters (such as minimum pattern size, probability threshold values, etc.) are configured based on the data selected and, optionally, default visualization parameters to generate a visualization at 810. In some example implementations, the subnetwork finding parameters may be user defined using a UI, such as the toolbar 320 of UI 300, by setting the size (using numeric fields 355) and link weight threshold (using control bar 365), which governs the pattern finding algorithm and what kind of patterns should be presented. In other example implementations, the initial subnetwork finding parameters may be administrator defined, or may be automatically generated using machine learning, or other automated process.

Once the initial subnetwork pattern finding parameters are configured, a user can refine visualization parameters at 815 using the grouping, sorting, and filtering functions. Based on user input at 815, the subnetwork finding parameters may be reconfigured and an updated visualization may be generated at 810. In some example implementations, the refining of the visualization parameters at 815 may also trigger selection of more, less, or different data for analysis at 805.

In addition to refining the visualization parameters, a user may also perform dynamic exploration of the results at 820 using "pinning", hovering or other data exploration functions. Based on user input at 820, the subnetwork finding parameters may be reconfigured and an updated visualization may be generated at 810. In some example implementations, the refining of the dynamic exploration of the results at 820 may also trigger selection of more, less, or different data for analysis at 805.

The refining of the visualization parameters at 815 and the dynamic exploration at 820 may be performed sequentially, or simultaneously. The difference between these two steps is that dynamic exploration at 820 does not trigger rearrangement of patterns (e.g., repositioning of repositioning of rows 325 in the UI 300), whereas visualization refinement at 815 may trigger rearrangement of patterns. In other words, dynamic exploration at 820 may be an operation on the entity and relationship level versus refinement of the visualization parameters at 815 may be an operation at the pattern level.

If no user input is received at either 815 or 820, the process 800 may end.

Figure 9:
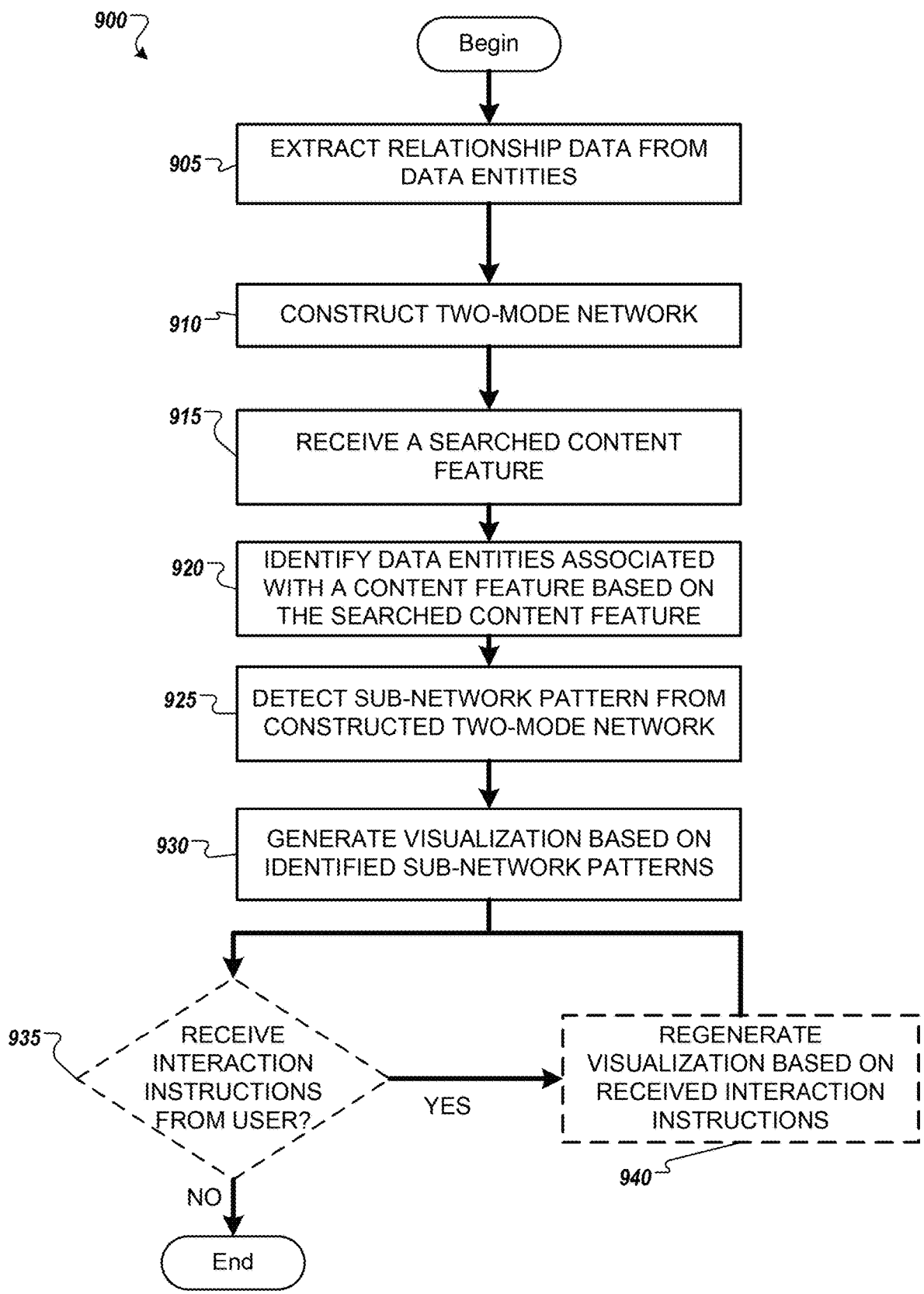
FIG. 9 illustrates a flowchart of a search result visualization process according to an example implementation of the present application.

FIG. 9 illustrates a flowchart of a search result visualization process 900 according to an example implementation of the present application. The illustrated process 900 may be performed by a processor (such as processors 1310) of a device or apparatus (such as computing device 1305 of FIG. 13) to provide search result detection and visualization. Some aspects of the process 900 may be similar to aspects of the process 200 discussed above. Thus, similar description may be provided. As illustrated, in process 900 relationship information is extracted from a plurality of data entities at 905. The data entities may be of two or more different types. The different types of data entities are not particularly limited and may include user entity, creator or author entity, reader entity, content item or document entity, purchase entity, communication entity or any other entity that might be apparent to a person of ordinary skill in the art. The entities may be received or selected from a database. The type of database is not particularly limited and may include any type of data records including email data, travel data, phone call data, instant message data, event data, content data, purchase data or any other type of data that might be apparent to a person of ordinary skill in the art.

The relationship information between the entities may be extracted by extracting content features from each of the plurality of entities. The extraction of the content features is not particularly limited and may include applying object recognition techniques (e.g., object recognition, facial recognition, character recognition, etc.) to images or videos associated with the content item to identify the visual content. Additionally, audio recognition techniques (e.g., audio event detection, audio characteristic classification, speech recognition, etc.) may be used to detect the audio content associated with the content item. Additionally, subject matter recognition algorithms may be used to detect subjects or topics of textual content of the content item. The extracted content features may also include other types of features about the content item such as location of capture or authorship (e.g., GPS data, etc.) or any other content features that might be apparent to a person of ordinary skill in the art.

The relationship data may be extracted from the entities by matching content features associated with entities of one type with corresponding content features of entities of another, different type. For example, if content features associated with a content item or document entities indicates authorship by a certain person or persons, and content features associated with a creator or author entities indicates identity information by the same person or persons, a relationship may be stored in the relationship data. Other examples relationships between entities of different types may be apparent to a person of ordinary skill in the art, including user entity-communication entity, user entity-purchase entity, reader entity-communication entity, reader entity-content or document entity, etc.

Once relationship data is extracted from the plurality of entities, a two-mode network may be constructed at 910 by connecting entities of one type to entities of a second type. In some example implementations, entities of one type (e.g., a first type) may only be connected directly with entities of the second, different type and not to other entities of the first type. Similarly, entities of the second type may only be connected directly with entities of the first type and not to other entities of the second type.

In some example implementations, relationships between individual entities of one type may be connected to individual entities of the second type based on predefined data, associated with each entity. For example, a creator or author entity relationship with a created content or document entity. In other example implementations, multiple entities of one type may be joined together to form the relationship. For example, posts in a chat application within a certain time frame may be grouped as a conversation and users who published posts within the conversation may be connected to the entire conversation.

After constructing a two-mode network, which may represents a real-world system, a search content feature to be used as part of a search request may be received at 915. In some example implementations, the search content feature may be received from a user entry into a search field of a UI. For example, a user may type one or more keywords into a text entry field of a search engine.

In other example implementations, the search content feature may be received by extracting the searched content feature from a content item (e.g., a text document such as an email, text message, chat message, paper, etc.; a media document, such an photo, video clip, audio recording; or any other content item that might be apparent to a person of ordinary skill in the art). The searched content feature may be extracted from the content item by applying object recognition techniques (e.g., object recognition, facial recognition, character recognition, etc.) to images or videos associated with the content item to identify the visual content. Additionally, audio recognition techniques (e.g., audio event detection, audio characteristic classification, speech recognition, etc.) may be used to detect the audio content associated with the content item. Additionally, subject matter recognition algorithms may be used to detect subjects or topics of textual content of the content item. The extracted search content feature may also include other types of features about the content item such as location of capture or authorship (e.g., GPS data, etc.) or any other content features that might be apparent to a person of ordinary skill in the art.

After the searched content feature is received, data entities in the two-mode network associated with content features analogous to the searched content feature may be identified at 920. In some example implementations, the data entities identified at 920 may be associated with content features that are identical or substantially identical to the searched content feature. For example, if the searched content feature is a name such as "John Smith", entities associated with content features such as "John Smith", "John XXX", or "XXX Smith" (with XXX representing wildcard characters) may be identified at 920.

In other example implementations, the data entities identified at 920 may also be associated with content features that are related to the received search content feature. For example, if the searched content feature is a genus (such as digital cameras), entities associated with content features representative of species (such as specific digital camera brands or models) may be identified at 920. Similarly, if the searched content feature is a species (such as a digital camera brand or model), entities associated with content features representative of the genus (such as digital cameras) may be identified at 920. Other relationships between the searched content feature and the content features used to identify entities may be apparent to a person of ordinary skill in the art.

After data entities are identified, subnetwork patterns containing the identified data entities may be detected at 925 using a variety of techniques. For example, brute force methods can be used to find subnetwork patterns such as cliques or faster (e.g., linear) approaches such as biclustering. Example implementations are not limited to any particular subnetwork pattern finding process and may use any technique to identify subnetwork patterns of interest that might be apparent to a person of ordinary skill in the art.

After the subnetwork patterns are identified, a visualization may be generated at 930. The generated visualization may be displayed on a computing device or apparatus such as a personal computer, a server, a mainframe, or any other computing device that might be apparent to a person of ordinary skill in the art. Example implementations of the visualization are discussed in greater detail below with respect to FIGS. 10-12. In some example implementations, the process 900 may end once the visualization is generated.

In other example implementations, a determination whether interaction instructions have been received from a user may optionally be made at 935. The user instructions may be received from a user input device such as a keyboard, pointing device (e.g., a mouse, trackball, touchpad), interactive display (e.g., a touch screen display), or any other user input device that might be apparent to a person of ordinary skill in the art. In some example implementations, the user instructions may be received through a user interface (UI), such as a toolbar or other control elements, integrated into the visualization generated at 930. In other example implementations, the user instructions may be received through a separate UI independent of the visualization generated at 930.

If user interaction instructions are received (YES at 935), the visualization may optionally be regenerated based on the received interaction instructions at 940. Regeneration of the visualization may include reordering portions of the visualization, repositioning portions of the visualization, removing portions from the visualization, adding portions to the visualization, or any other changes to the visualization that might be apparent to a person of ordinary skill in the art. Example implementations of a process of regenerating the visualization are discussed in greater detail above with respect to FIG. 8.

Conversely, if no user interactions are received (NO at 940), the process 900 may end.

In the process 900 illustrated in FIG. 9, a two-mode network is constructed at 910, the content feature to be searched is received at 915, and the subnetwork pattern is detected at 925. However, example implementations of the present application are not limited to the order of sub-processes illustrated in FIG. 9. For example, in other example implementations, a content feature to be searched may be received first, a two-mode network constructed based on items retrieved based on the received content feature, and then subnetwork patterns detected in the created network. Other arrangement of the sub-processes may be apparent to a person of ordinary skill in the art.

Figure 10:
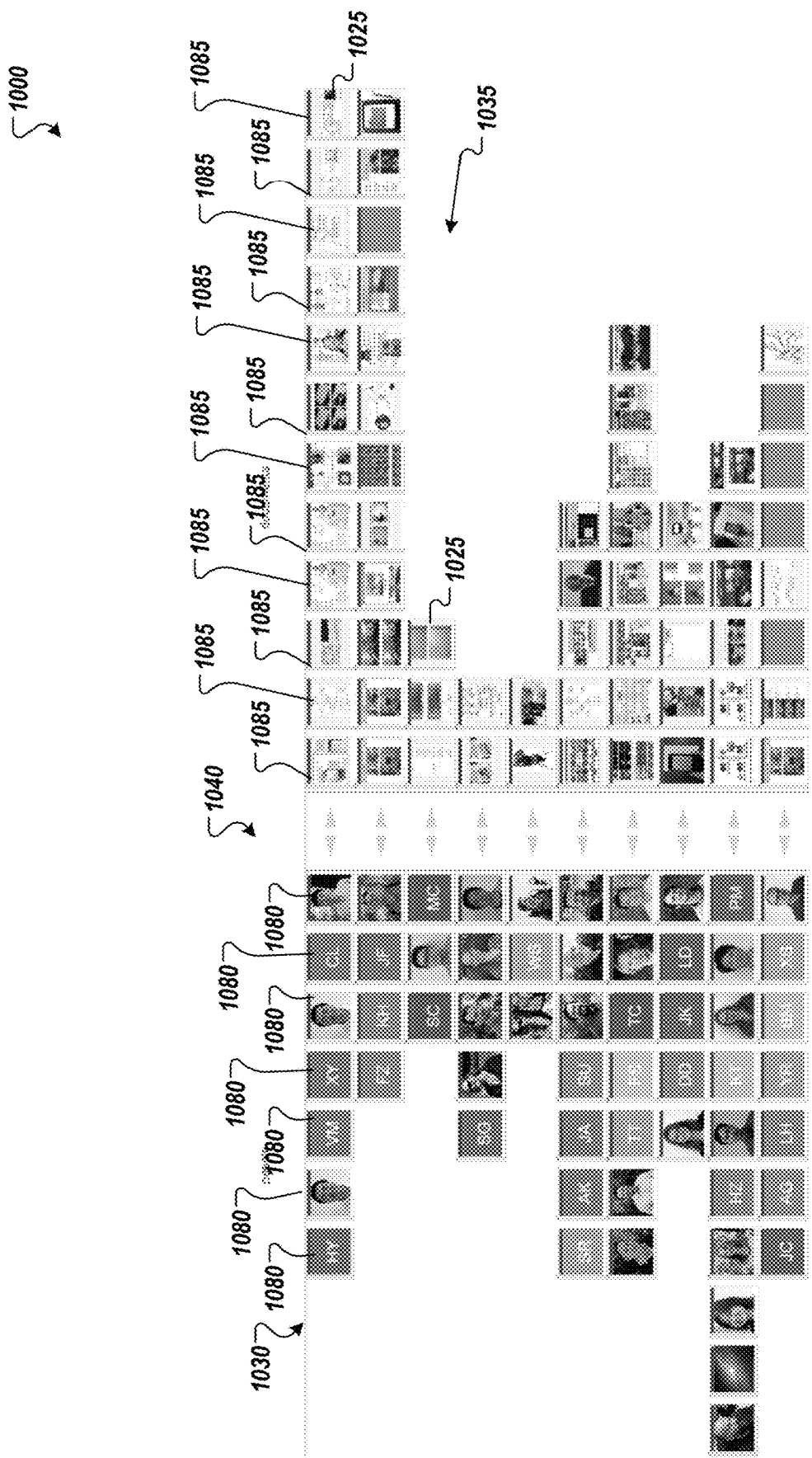
FIG. 10 illustrates a UI usable as a visualization in accordance with another example implementation of the present application.

FIG. 10 illustrates a user interface (UI) 1000 usable as a visualization in accordance with another example implementation of the present application. The UI 1000 may be produced using the process 900 discussed above and may be displayed on a computing device or apparatus such as a personal computer, a server, a mainframe, or any other computing device that might be apparent to a person of ordinary skill in the art. The UI 1000 may represent a visualization for exploring search results of documents in a document corpus. For example, based on the search terms that a user inputs, the UI 1000 may present a list of authors & document entity sets ordered by relevancy.

The entity sets may have been constructed based on the two-mode network of authors and documents (such as publications, reports, etc.) and further extracted based on a user's search. The UI 1000 may allow a user to explore the results to discover further findings. For example, user may be able to identify relevant key documents/authors by browsing their connections because it broadens the scope, so that the user may refine his/her search more effectively. Other types of visualizations are discussed in greater detail above with respect to FIGS. 3-7 and below with respect to FIGS. 11 and 12.

In some example implementations, the UI 1000 may be a plurality of rows 1025, each row 1025 representing one of the detected subnetwork patterns. For ease of illustration only two rows 1025 have been labeled in FIG. 10. However, each of the rows illustrated in the UI 1000 of FIG. 10 may be representative of one of the detected subnetwork patterns even if a reference numeral is not provided. Within each row 1025 of the UI 1000, three regions 1030, 1035, 1040 may be provided. The left region 1030 may be associated with a first type of entity represented by node icons 1080. The right region 1035 may be associated with a second type of entity represented by node icons 1085. Depending on the type of entity represented by each node icon 1080, 1085, the node icon 1080, 1085 may be shown as an image, or a text summary. For example, a document corpus search result analysis implementation is illustrated in FIG. 10. As illustrated, entities of the first type in the left region 1030 are people (e.g., authors, content creators, etc.) and node icons 1080 are rendered as images of their profiles or characters associated with the people (e.g., author initials, content creator initials, etc.). Further, the entities of the second type in the right region 1035 are documents (e.g., papers, articles, photos, or other content items) and node icons 1085 are rendered with a thumbnail of the document or a portion of the document (e.g., a first page, a selected page, etc.). The node icons 1080, 1085 may also include additional features as discussed in greater detail above with respect to general node icon 500 of FIG. 5.

The left region 1030 is connected to right region 1035 by a central or linking region 1040. In the example implementation of FIG. 10, a simplified linking region is illustrated. However, in other example implementations, the linking region 1040 may provide information about the subnetwork pattern associated with each row 1025 as discussed in greater detail below. Additionally, though not illustrated in FIG. 10, other example implementations of the UI 1000 may also provide an information panel, an overview, and a toolbar, similar to the information panel 310, overview region 315, and toolbar 320 of the UI 300 illustrated in FIG. 3 and discussed above.

Figure 11:
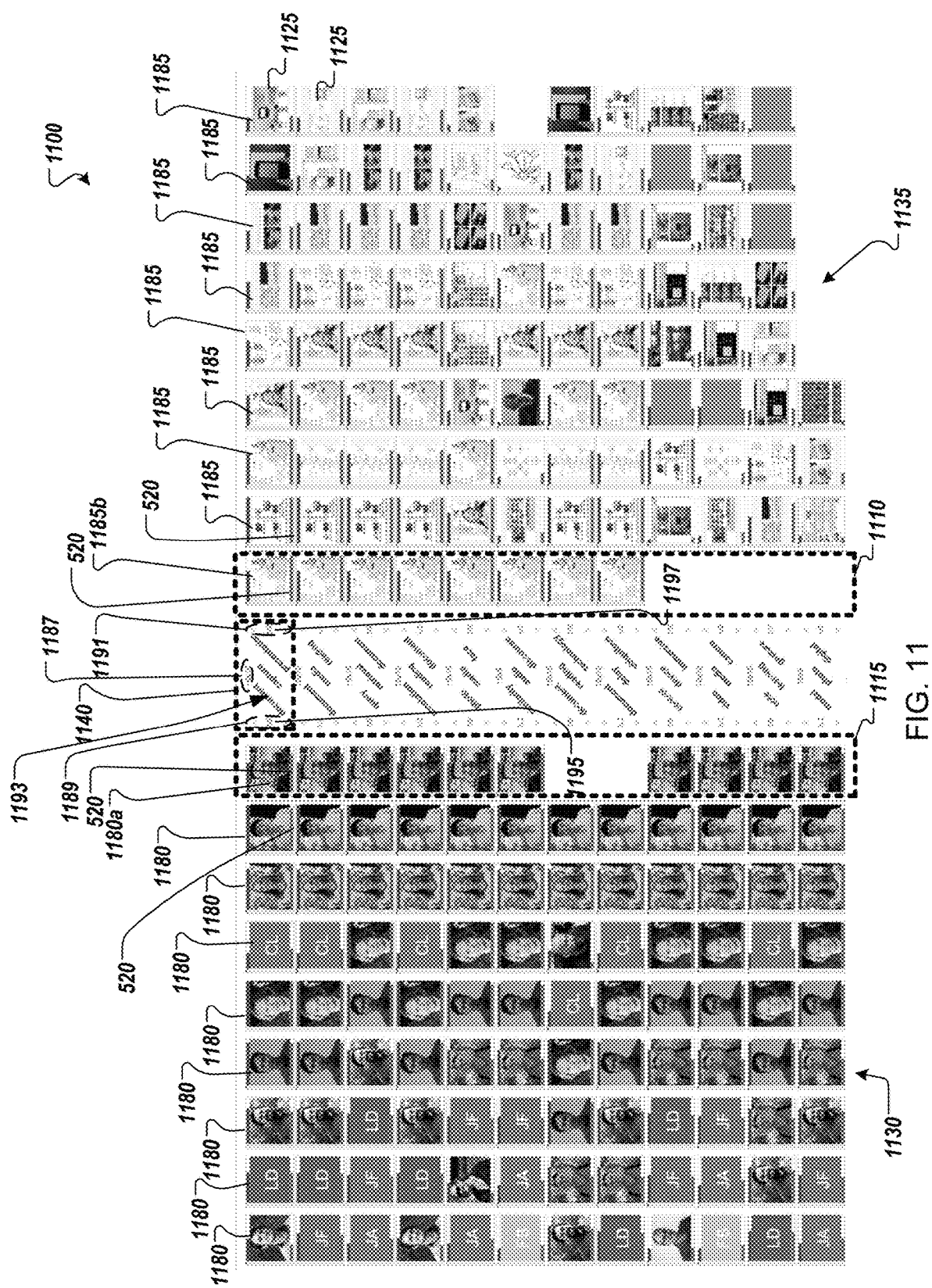
FIG. 11 illustrates a UI usable as a visualization in accordance with another example implementation of the present application.

FIG. 11 illustrates another user interface (UI) 1100 usable as a visualization in accordance with another example implementation of the present application. The UI 1100 may be produced using the process 900 discussed above and may be displayed on a computing device or apparatus such as a personal computer, a server, a mainframe, or any other computing device that might be apparent to a person of ordinary skill in the art. Similar to UI 1000 of FIG. 10, the UI 1100 may represent a visualization for exploring search results of documents in a document corpus. For example, based on the search terms that a user inputs, the UI 1100 may present a list of authors and document entity sets ordered by relevancy.

The entity sets may have been constructed based on the two-mode network of authors and documents (such as publications, reports, etc.) and further extracted based on a user's search. The UI 1100 may allow a user to explore the results to discover further findings. For example, user may be able to identify relevant key documents/authors by browsing their connections because it broadens the scope, so that the user may refine his/her search more effectively. Other types of visualizations are discussed above with respect to FIGS. 3-7 and 10 and below with respect to FIGS. 12A and 12B.

In some example implementations, the UI 1100 may provide a plurality of rows 1125, each row 1125 representing one of the detected subnetwork patterns. For ease of illustration, only two rows 1125 have been labeled in FIG. 11. However, each of the rows illustrated in the UI 1100 of FIG. 11 may be representative of one of the detected subnetwork patterns even if a reference numeral is not provided. Within each row 1125 of the UI 1100, three regions 1130, 1135, 1140 may be provided. The left region 1130 may be associated with a first type of entity represented by node icons 1180. The right region 1135 may be associated with a second type of entity represented by node icons 1185. Depending on the type of entity represented by each node icon 1180, 1185, the node icon 1180, 1185 may be shown as an image, or a text summary. For example, a document corpus search result analysis implementation is illustrated in FIG. 11. As illustrated, entities of the first type in the left region 1130 are people (e.g., authors, content creators, etc.) and node icons 1180 are rendered as images of their profiles or characters associated with the people (e.g., author initials, content creator initials, etc.). Further, the entities of the second type in the right region 1135 are documents (e.g., papers, articles, photos, or other content items) and node icons 1185 are rendered with a thumbnail of the document or a portion of the document (e.g., a first page, a selected page, etc.). The node icons 1180, 1185 may also include additional features as discussed in greater detail above with respect to general node icon 500 of FIG. 5.

Additionally, in the UI 1100 of FIG. 11, a "pinning" operation, similar to the operation discussed in FIG. 7, has been performed on both an entity of the first type and an entity of the second type. Specifically, based on user input, one of entities of the first type (1180a) and one of the entities of the second type (1185b) has been selected or "pinned" for deeper exploration. After the entities 1180a and 1185b have been pinned, the UI 1100 has been arranged to form separate columns for entity 1180a and 1185b. This may allow clearer visualization to see which subnetwork patterns the entities 1180a and 1185b belongs to. When the entity 1180a is pinned, the other unpinned entities 1180 may be ordered based on their relevancy to the pinned entity 1180a in each row. Similarly, when the entity 1185b is pinned, the other unpinned entities 1185 may be ordered based on their relevancy to the pinned entity 1185b in each row. This may bring more relevant entities to the center (represented by broken rectangles 1110, 1115) region 1140 so that an analyst can more easily access them. After pinning entity 1180a and entity 1185b, the second horizontal bar 520 of the entities 1180, 1180a, 1185, 1185b may be dynamically shown under each node icon, representing the proportion of patterns to which that entity 1180, 1180a, 1185, 1185b belongs, among all the "selected" patterns. Again, selected patterns mean the patterns containing at least one of the pinned entities 1180a, 1185b. So the length of the second horizontal bar 520 indicates how many selected patterns contain a specific entity 1180, 1185. This may help an analyst to identify a next most relevant entity 1180, 1185 with respect to the pinned entities 1180a, 1185.

The left region 1130 is connected to right region 1135 by a central or linking region 1140. The central or linking region 1140 may provide information about the subnetwork pattern associated with each row 1125. For example, a subnetwork pattern size indicator 1187 may be provided to identify size of the subnetwork pattern identified. The subnetwork pattern size indicator 1187 (highlighted with a broken oval) may indicate the number of entities of the first type in the right region 1130 and a number of entities of the second type in left region 1135. In the example implementation illustrated in FIG. 11, the subnetwork pattern size indicator 1187 value of "10×10" may indicate that subnetwork pattern associated with the illustrated row 1125 includes 10 entities of the first type in the left region 1130 and 10 entities of the second type in the right region 1135.

Additionally, in some implementations more entities of the first type 1180a, 1180 or the second type 1185b, 1185 may be associated with a subnetwork pattern than can be displayed in the left and right regions 1130, 1135 of the row 1125. In such implementations, the linking region 1140 may provide user interface (UI) controls 1189, 1191 (highlighted with broken ovals) associated with the left region 1130 and right regions 1135 respectively. Each UI control 1189, 1191 may allow scrolling or toggling of the left and right regions 1130, 1135 respectively, to display additional entities of the first type 1180a, 1180 or the second type 1185b, 1185 that cannot be displayed. Each UI controls 1189, 1191 may also have page indicators 1195, 1197. The page indicator 1195 may indicate the current page of entities 1180a, 1180 being displayed in the left region 1130. Additionally, in some example implementations, the page indicator 1195 may also indicate the total number of pages of entities 1180a, 1180 available. In the example implementation illustrated in FIG. 11, the page indicator 1195 value of "1/2" may indicate that currently page number "1" of a total of two available pages is displayed in the left region 1130.

Similarly, the page indicator 1197 may indicate the current page of entities 1185b, 1185 being displayed in the right region 1135. Additionally, in some example implementations, the page indicator 1197 may also indicate the total number of pages of entities 1185b, 1185 available. In the example implementation illustrated in FIG. 11, the page indicator 1197 value of "1/2" may indicate that currently page number "1" of a total of two available pages is displayed in the right region 1135.

Further, in some example implementations the central or linking region 1140 may also provide information 1193 about the subnetwork pattern associated with each row 1125. For example, as illustrated in FIG. 11, the information 1193 may include keywords associated with the content features linking the entities 1180a, 1180 in the left region 1130 to the entities 1185b, 1185 in the right region 1135. Additionally, though not illustrated in FIG. 11, other example implementations of the UI 1100 may also provide an information panel, an overview, and a toolbar, similar to the information panel 310, overview region 315, and toolbar 320 of the UI 300 illustrated in FIG. 3 and discussed above.

Figure 12A:
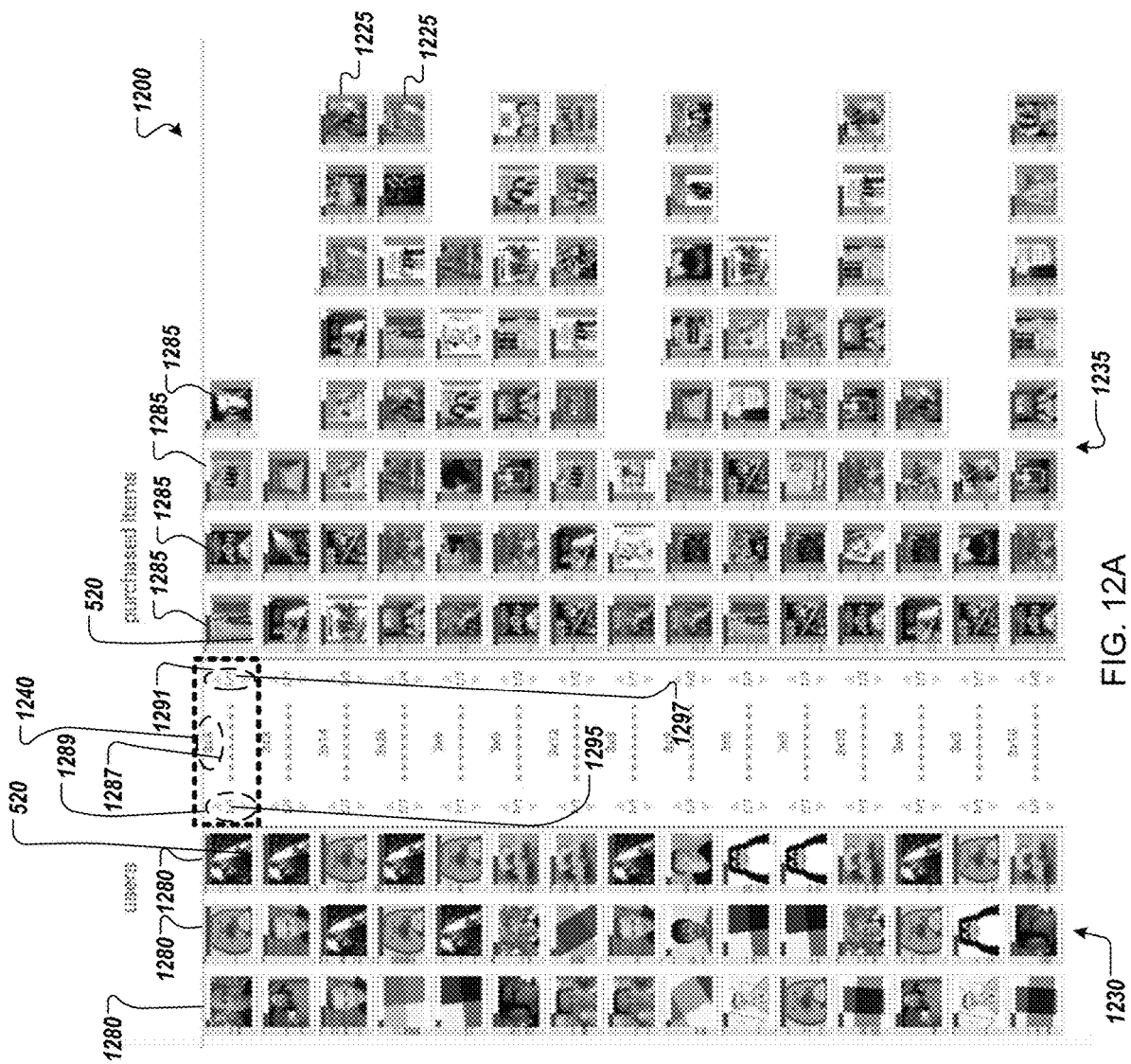

FIGS. 12A and 12B illustrate example implementations of a UI 1200 usable as a visualization in accordance with another example implementation of the present application. FIG. 12A illustrates the UI 1200 without any entities 1280, 1285 selected or pinned.

The UI 1200 may be produced using the process 900 discussed above and may be displayed on a computing device or apparatus such as a personal computer, a server, a mainframe, or any other computing device that might be apparent to a person of ordinary skill in the art. The UI 1200 may represent a visualization for exploring search results of purchases in an online commerce platform. For example, based on the search terms that a user inputs, the UI 1200 may present a list of customers and purchased item entity sets ordered by relevancy.

The entity sets may have been constructed based on the two-mode network of customers and purchased items (such as movies, books, TV shows, etc.) and further extracted based on a user's search. The UI 1200 may allow a user to explore the results to discover further findings. For example, user may be able to identify relevant key purchased items/ purchasers by browsing their connections because it broadens the scope, so that the user may refine his/her search more effectively. Other types of visualizations are discussed above with respect to FIGS. 3-7, 10 and 11.

In some example implementations, the UI 1200 may provide a plurality of rows 1225, each row 1225 representing one of the detected subnetwork patterns. For ease of illustration, only two rows 1225 have been labeled in FIG. 12A. However, each of the rows illustrated in the UI 1200 of FIG. 12A may be representative of one of the detected subnetwork patterns even if a reference numeral is not provided. Within each row 1225 of the UI 1200, three regions 1230, 1235, 1240 may be provided. The left region 1230 may be associated with a first type of entity represented by node icons 1280. The right region 1235 may be associated with a second type of entity represented by node icons 1285. Depending on the type of entity represented by each node icon 1280, 1285, the node icon 1280, 1285 may be shown as an image, or a text summary. For example, an online commerce platform purchase search result analysis implementation is illustrated in FIGS. 12A and 12B. As illustrated, entities of the first type in the left region 1230 are people (e.g., purchasers, customer, etc.) and node icons 1280 are rendered as images of their profiles or characters associated with the people (e.g., purchasers, customer, etc.). Further, the entities of the second type in the right region 1235 are purchases (e.g., books, movies, TV shows, etc.) and node icons 1285 are rendered with a thumbnail representative of a purchase (e.g., a cover, a poster, representative character, etc.). The node icons 1280, 1285 may also include additional features as discussed in greater detail above with respect to general node icon 500 of FIG. 5.

Additionally in FIG. 12B, the UI 1200 illustrates a "pinning" operation, similar to the operation discussed in FIG. 7 performed on both an entity of the first type and an entity of the second type. Specifically, based on user input, one of entities of the first type (1280*a*) and one of the entities of the second type (1285*b*) has been selected or "pinned" for deeper exploration. After the entities 1280*a* and 1285*b* have been pinned, the UI 1200 has been arranged to form separate columns for entity 1280*a* and 1285*b*. This may allow clearer visualization to see which subnetwork patterns the entities 1280*a* and 1285*b* belongs to. When the entity 1280*a* is pinned, the other unpinned entities 1280 may be ordered based on their relevancy to the pinned entity 1280*a* in each row. Similarly, when the entity 1285*b* is pinned, the other unpinned entities 1285 may be ordered based on their relevancy to the pinned entity 1285*b* in each row. This may bring more relevant entities to the center (represented by broken rectangles 1210, 1215) region 1240 so that an analyst can more easily access them. After pinning entity 1280*a* and entity 1285*b*, the second horizontal bar 520 of the entities 1280, 1280*a*, 1285, 1285*b* may be dynamically shown under each node icon, representing the proportion of patterns to which that entity 1280, 1280*a*, 1285, 1285*b* belongs, among all the "selected" patterns. Again, selected patterns mean the patterns containing at least one of the pinned entities 1280*a*, 1285*b*. So the length of the second horizontal bar 520 indicates how many selected patterns contain a specific entity 1280, 1285. This may help an analyst to identify a next most relevant entity 1280, 1285 with respect to the pinned entities 1280*a*, 1285.

The left region 1230 is connected to right region 1235 by a central or linking region 1240. The central or linking region 1240 may provide information about the subnetwork pattern associated with each row 1225. For example, a subnetwork pattern size indicator 1287 may be provided to identify size of the subnetwork pattern identified. The subnetwork pattern size indicator 1287 (highlighted with a broken oval) may indicate the number of entities of the first type in the right region 1230 and a number of entities of the second type in left region 1235. In the example implementation illustrated in FIGS. 12A and 12B, the subnetwork pattern size indicator 1287 value of "3×4" may indicate that subnetwork pattern associated with the illustrated row 1225 includes 3 entities of the first type in the left region 1230 and 4 entities of the second type in the right region 1235.

Additionally, in some implementations more entities of the first type 1280*a*, 1280 or the second type 1285*b*, 1285 may be associated with a subnetwork pattern than can be displayed in the left and right regions 1230, 1235 of the row 1225. In such implementations, the linking region 1240 may provide user interface (UI) controls 1289, 1291 (highlighted with broken ovals) associated with the left region 1230 and right regions 1235 respectively. Each UI control 1289, 1291 may allow scrolling or toggling of the left and right regions 1230, 1235 respectively, to display additional entities of the first type 1280*a*, 1280 or the second type 1285*b*, 1285 that cannot be displayed. Each UI controls 1289, 1291 may also have page indicators 1295, 1297. The page indicator 1295 may indicate the current page of entities 1280*a*, 1280 being displayed in the left region 1230. Additionally, in some example implementations, the page indicator 1295 may also indicate the total number of pages of entities 1280*a*, 1280 available. In the example implementation illustrated in FIGS. 12A and 12B, the page indicator 1295 value of "1/1" may indicate that currently page number "1" of a total of one available pages is displayed in the left region 1230.

Similarly, the page indicator 1297 may indicate the current page of entities 1285*b*, 1285 being displayed in the right region 1235. Additionally, in some example implementations, the page indicator 1297 may also indicate the total number of pages of entities 1285*b*, 1285 available. In the example implementation illustrated in FIGS. 12A and 12B, the page indicator 1297 value of "1/1" may indicate that currently page number "1" of a total of one available pages is displayed in the right region 1235.

Additionally, though not illustrated in FIGS. 12A and 12B, other example implementations of the UI 1200 may also provide an information panel, an overview, and a toolbar, similar to the information panel 310, overview region 315, and toolbar 320 of the UI 300 illustrated in FIG. 3 and discussed above.

EXAMPLE COMPUTING ENVIRONMENT

Figure 13:
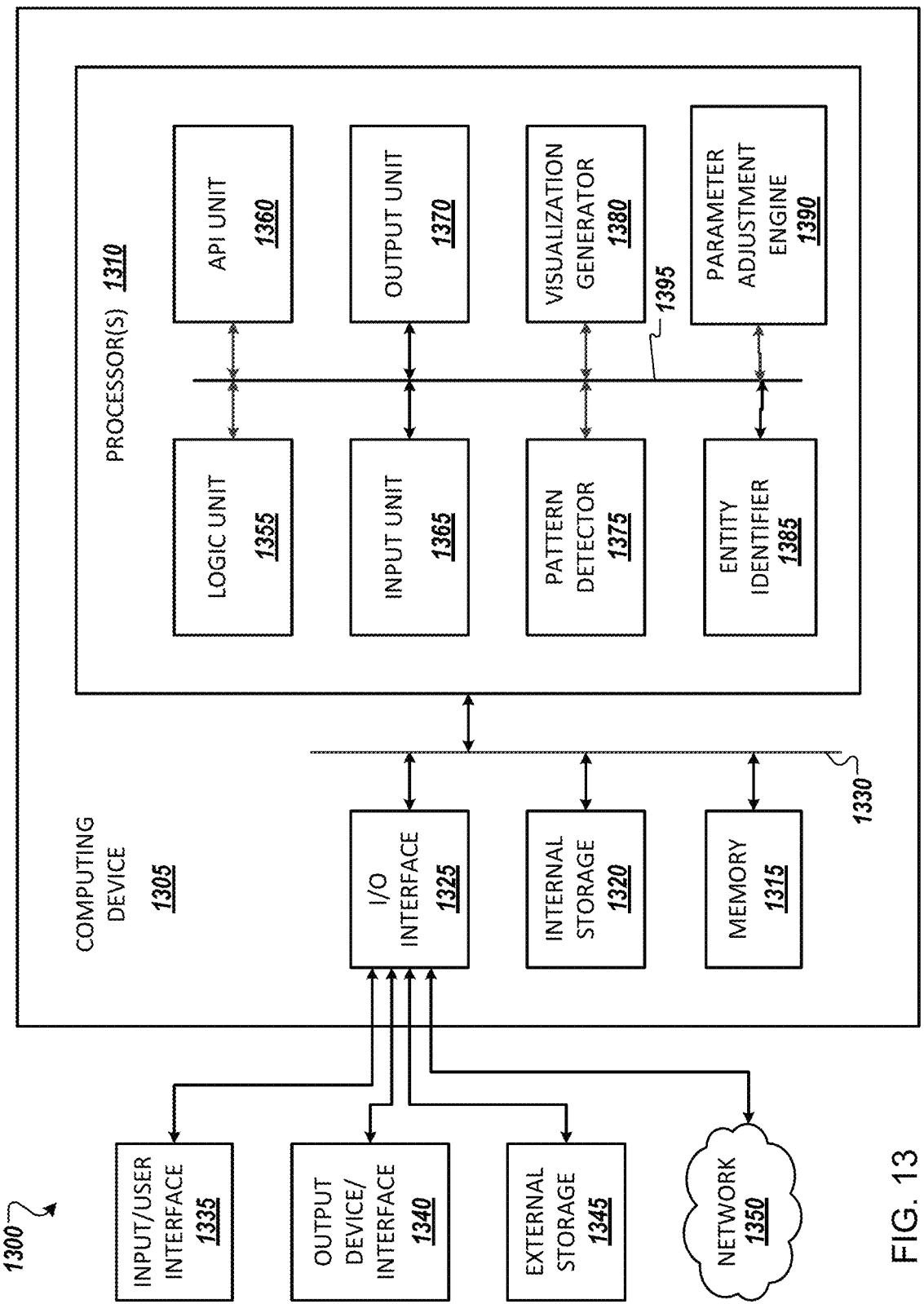
FIG. 13 illustrates an example computing environment with an example computer device suitable for use in some example implementations of the present application.

FIG. 13 illustrates an example computing environment 1300 with an example computer device 1305 suitable for use in some example implementations. Computing device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computing device 1305.

Computing device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with, or physically coupled to, the computing device 1305. In other example implementations, other computing devices may function as, or provide the functions of, an input/user interface 1335 and output device/interface 1340 for a computing device 1305.

Examples of computing device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1305 can be communicatively coupled (e.g., via I/O interface 1325) to external storage 1345 and network 1350 for communicating with any number of networked components, devices, and systems, including one or more computing devices of the same or different configuration. Computing device 1305 or any connected computing device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computing device 1305 can use and/or communicate using computer-usable or computer-readable media, including transitory media and non-transitory media. Transitory media includes transmission media (e.g., metal cables, fiber optics), signals, carrier waves, and the like. Non-transitory media included magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment. One or more applications can be deployed that include logic unit 1355, application programming interface (API) unit 1360, input unit 1365, output unit 1370, pattern detector 1375, visualization generator 1380, entity identifier 1385, parameter adjustment engine 1390, and inter-unit communication mechanism 1395 for the different units to communicate with each other, with the OS, and with other applications (not shown). For example, pattern detector 1375, visualization generator 1380, entity identifier receiver 1385, and parameter adjustment engine 1390 may implement one or more processes shown in FIGS. 2, 8, and 9. The described units and elements can be varied in design, function, configuration, or implementation and are not limited to the descriptions provided.

In some example implementations, when information or an execution instruction is received by API unit 1360, it may be communicated to one or more other units (e.g., logic unit 1355, input unit 1365, pattern detector 1375, visualization generator 1380, entity identifier 1385, parameter adjustment engine 1390). For example, the pattern detector 1375 may receive relationship data via the input unit 1365, and provide the detected subnetwork patterns to the visualization generator 1380. Additionally, in some example implementations, the entity identifier 1385 may receive a content feature from the input unit 1365 and identify entities based on the received content feature. The identified entities may be provided to, and used by, the pattern detector 1375 to detect subnetwork patterns based on the received content features in some embodiments. Once the pattern detector 1375 has detected one or more subnetwork patterns, the detected subnetwork patterns may be provided to the visualization generator 1385 to generate the visualization. Further, the parameter adjustment engine 1390 may control the visualization generator 1385 and the pattern detector 1375 to update and modify the visualization.

In some instances, the logic unit 1355 may be configured to control the information flow among the units and direct the services provided by API unit 1360, input unit 1365, output unit 1370, pattern detector 1375, visualization generator 1380, entity identifier 1385, and parameter adjustment engine 1390 in some example implementations described above. For example, the flow of one or more processes or implementations may be controlled by logic unit 1355 alone or in conjunction with API unit 1360.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of visualizing relationship data in a network connecting an entity of a first type with an entity of a second type, the method comprising:
    detecting, within the network, a subnetwork pattern representing at least one relationship satisfying a condition, wherein the relationship data comprises a plurality of entities of the first type, a plurality of entities of the second type, and data representative of a plurality of relationships, each relationship connecting an entity of the plurality of entities of the first type to each entity of the plurality of entities of the second type; and
    wherein the detecting the subnetwork pattern comprises detecting a plurality of subnetwork patterns satisfying the condition; and
    generating a visualization for display within a user interface based on the detected subnetwork pattern by:
        assigning a plurality of first node icons representative of the plurality of entities of the first type within a first region comprising horizontal rows;
        assigning a plurality of second node icons representative of the plurality of entities of the second type within a second region comprising horizontal rows;
        defining a linking region represented by third node icons with each node positioned along each horizontal row connecting the first and second regions while providing information about the at least one relationship satisfying the condition in order to visualize maximal subnetworks within the network;
        wherein each node representative of an entity of the first type in the subnetwork having a connecting relationship with each node representative of an entity of the second type in the subnetwork.

2. The method of claim 1, wherein each first node icon and each second node icon comprises:
    a first region representative of content associated with the selected entity; and
    a second region representative of a number of subnetwork patterns selected from the detected plurality of subnetwork patterns with which the selected entity is associated.

3. The method of claim 2, further comprising:
    receiving an input command selecting a subset of subnetwork patterns of the detected plurality of subnetwork patterns; and
    wherein the at least one node icon further comprises a third region representative of a number of the subset of subnetwork patterns, which the selected entity is associated.

4. The method of claim 2, wherein the at least one node icon further comprises a fourth region having a graphical element associated with each relationship within the detected plurality of subnetwork patterns with which the selected entity is associated.

5. The method of claim 4, wherein the graphical element associated with each relationship is arranged within the fourth region based on a relative weight associated with each relationship within the detected plurality of subnetwork patterns with which the selected entity is associated.

6. The method of claim 2, wherein the first type of entity is representative of users of a communication system;
    wherein the second type of entity is representative of communications within the communication system; and
    wherein the linking region comprises information representative of a number of entities of the first type and information representative of a number of entities of the second type associated with each subnetwork pattern.

7. The method of claim 6, wherein the first region of the node icon includes a visual representation of data indicative of a content feature associated with the selected entity.

8. The method of claim 1, further comprising:
    receiving an input signal identifying an entity of either the first type and the second type; and
    updating the visualization based on the identified entity.

9. The method of claim 8, wherein the updating the visualization comprises at least one of:
    repositioning at least one row associated with a subnetwork pattern representing a relationship comprising the identified entity;
    repositioning at least one node icon associated with the identified entity.

10. The method of claim 1, wherein, for each horizontal row, the third node icon comprises controls to scroll or toggle the plurality of first node icons in the first region and the plurality of second node icons in the second region of the respective horizontal row.

11. The method of claim 1, wherein
    at least one first node icon of a first horizontal row is vertically aligned with at least one first node icon of a second horizontal row, the first horizontal row being associated with a first of the plurality of detected subnetwork patterns satisfying the condition and the second horizontal row associated with a second of the plurality of detected subnetwork patterns satisfying the condition; and
    at least one second node icon of the first horizontal row is vertically aligned with at least one second node icon of the second horizontal row.

12. A non-transitory computer readable medium having stored therein a program for making a computer execute a method of visualizing relationship data in a network connecting an entity of a first type with an entity of a second type, the method comprising:
    detecting, within the network, a subnetwork pattern representing at least one relationship satisfying a condition, wherein the relationship data comprises a plurality of entities of the first type, a plurality of entities of the second type, and data representative of a plurality of relationships, each relationship connecting an entity of the plurality of entities of the first type to each entity of the plurality of entities of the second type; and
    wherein the detecting the subnetwork pattern comprises detecting a plurality of subnetwork patterns satisfying the condition; and
    generating a visualization for display within a user interface based on the detected subnetwork pattern by:
        assigning a plurality of first node icons representative of the plurality of entities of the first type within a first region comprising horizontal rows;
        assigning a plurality of second node icons representative of the plurality of entities of the second type within a second region comprising horizontal rows;
        defining a linking region represented by third node icons with each node positioned along each horizontal row connecting the first and second regions while providing information about the at least one relationship satisfying the condition in order to visualize maximal subnetworks within the network;
        wherein each node representative of an entity of the first type in the subnetwork having a connecting relationship with each node representative of an entity of the second type in the subnetwork.

13. The non-transitory computer readable medium of claim 12, wherein each first node icon and each second node icon comprises:
    a first region representative of content associated with the selected entity; and
    a second region representative of a number of subnetwork patterns selected from the detected plurality of subnetwork patterns with which the selected entity is associated.

14. The non-transitory computer readable medium of claim 13, further comprising:
    receiving an input command selecting a subset of subnetwork patterns of the detected plurality of subnetwork patterns; and
    wherein the at least one node icon further comprises a third region representative of a number of subset of subnetwork patterns, which the selected entity is associated.

15. The non-transitory computer readable medium of claim 13, wherein the at least one node icon further comprises a fourth region having a graphical element associated with each relationship within the detected plurality of subnetwork patterns with which the selected entity is associated.

16. The non-transitory computer readable medium of claim 15, wherein the graphical element associated with each relationship is arranged within the fourth region based on a relative weight associated with each relationship within the detected plurality of subnetwork patterns with which the selected entity is associated.

17. The non-transitory computer readable medium of claim 13, wherein the first type of entity is representative of users of a communication system;
    wherein the second type of entity is representative of communications within the communication system; and
    wherein the linking region comprises information representative of a number of entities of the first type and information representative of a number of entities of the second type associated with each subnetwork pattern.

18. The non-transitory computer readable medium of claim 17, wherein the first region of the node icon includes a visual representation of data indicative of a content feature associated with the selected entity.

19. The non-transitory computer readable medium of claim 12, further comprising:
    receiving an input signal identifying an entity of either the first type and the second type; and
    updating the visualization based on the identified entity.

20. A computer apparatus configured to visualize relationship data in a network connecting an entity of a first type with an entity of a second type, the computer apparatus comprising:
    a memory storing the relationship data comprising a plurality of entities of the first type, a plurality of entities of the second type, and data representative of a plurality of relationships, each relationship connecting an entity of the plurality of entities of the first type to an entity of the plurality of entities of the second type;
    a processor executing a process comprising:
        detecting, within the network, a plurality of subnetwork patterns, each of the plurality of subnetwork patterns representing at least one relationship satisfying a condition, wherein the detecting the subnetwork pattern comprises detecting a plurality of subnetwork patterns satisfying the condition; and
        generating a visualization for display within a user interface based on the detected plurality of subnetwork patterns by:
        assigning a plurality of first node icons representative of the plurality of entities of the first type within a first region comprising horizontal rows;
        assigning a plurality of second node icons representative of the plurality of entities of the second type within a second region comprising horizontal rows;
        defining a linking region represented by third node icons with each node positioned along each horizontal row connecting the first and second regions while providing information about the at least one relationship satisfying the condition in order to visualize maximal subnetworks within the network;
    wherein each node representative of an entity of the first type in the subnetwork having a connecting relationship with each node representative of an entity of the second type in the subnetwork.

* * * * *